US008425782B2

(12) United States Patent
Culler

(10) Patent No.: US 8,425,782 B2
(45) Date of Patent: *Apr. 23, 2013

(54) WASTEWATER CONCENTRATOR METHOD AND SYSTEM

(71) Applicant: Ecolivegreen Corp., Parkland, FL (US)

(72) Inventor: Paul L Culler, Tequesta, FL (US)

(73) Assignee: Ecolivegreen Corp., Parkland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,211

(22) Filed: Nov. 22, 2012

(65) Prior Publication Data

US 2013/0075329 A1    Mar. 28, 2013

Related U.S. Application Data

(63) Continuation-in-part of application No. PCT/US2011/005896, filed on Oct. 30, 2011, which is a continuation-in-part of application No. 12/954,809, filed on Nov. 26, 2010, now Pat. No. 8,066,887.

(51) Int. Cl.
*C02F 1/00* (2006.01)
*B01D 61/00* (2006.01)
*B01D 61/58* (2006.01)
*B01D 36/04* (2006.01)

(52) U.S. Cl.
USPC ........... 210/739; 210/614; 210/623; 210/650; 210/652; 210/920; 210/257.2; 210/98; 210/103; 210/787; 210/747.1; 210/607

(58) Field of Classification Search .................. None
See application file for complete search history.

(56) References Cited

U.S. PATENT DOCUMENTS

| 3,805,817 A | 4/1974 | Smith |
| 4,130,481 A * | 12/1978 | Chase et al. .................. 210/603 |

(Continued)

FOREIGN PATENT DOCUMENTS

| CN | 120515380 A | 6/2012 |
| GB | 454597 A | 10/1936 |

(Continued)

OTHER PUBLICATIONS

EVTN Voraxial Grit Separator Hillsborough County Demonstration Project Report PO No. DPWA03728202, Sep. 2004, pp. 1-12, Envro Voraxial Technology Inc., Fort Lauderdale, FL.

(Continued)

*Primary Examiner* — Krishnan S Menon
(74) *Attorney, Agent, or Firm* — Stone Creek Services LLC; Alan M Flum

(57) ABSTRACT

Disclosed is a system for reducing the demand of wastewater volume flowing through a wastewater collection piping system thereby increasing the effective capacity of the system. A portion of the wastewater is diverted from a sewer main. The solids are separated from the liquid; for example, by a centrifugal separator such as a vortex or cyclone separator. The recovered liquid can be treated and made available for reuse or disposed of. The separated or concentrated solids are reintroduced into the sewer main dynamically in a portion that adjusts the wastewater loading, or alternatively, the solids loading, in the sewer main to a predetermined amount or predetermined range. The system can be adapted to reducing demand of wastewater volume flowing within a wastewater treatment plant by diverting the wastewater in the flow path between the wastewater plant inlet and the biological processing stage and reintroducing separated solids downstream.

33 Claims, 27 Drawing Sheets

U.S. PATENT DOCUMENTS

| | | | |
|---|---|---|---|
| 4,303,526 A | 12/1981 | Moro et al. | |
| 4,415,452 A | 11/1983 | Heil | |
| 4,501,664 A | 2/1985 | Heil | |
| 5,022,993 A | 6/1991 | Williamson | |
| 5,084,189 A | 1/1992 | Richter | |
| 5,910,249 A | 6/1999 | Kopp | |
| 6,113,787 A * | 9/2000 | Czermak et al. | 210/605 |
| 7,169,305 B2 | 1/2007 | Gomez | |
| 7,510,661 B2 | 3/2009 | Hills | |
| 7,582,216 B2 * | 9/2009 | Arnott et al. | 210/747.3 |
| 8,062,522 B1 | 11/2011 | Culler | |
| 8,066,887 B1 | 11/2011 | Culler | |
| 8,101,078 B1 | 1/2012 | Culler | |
| 8,142,656 B1 | 3/2012 | Culler | |
| 2002/0185448 A1 | 12/2002 | Chisholm et al. | |
| 2005/0242011 A1 | 11/2005 | Hunniford et al. | |
| 2007/0041790 A1 | 2/2007 | Cripps | |
| 2007/0051677 A1 * | 3/2007 | Curtis et al. | 210/623 |
| 2009/0176638 A1 | 7/2009 | Di Bella | |
| 2010/0140167 A1 | 6/2010 | Sun et al. | |
| 2012/0255902 A1 * | 10/2012 | Livingston | 210/607 |

FOREIGN PATENT DOCUMENTS

| | | |
|---|---|---|
| JP | 2000317447 A | 11/2000 |
| WO | 9527682 | 10/1995 |
| WO | 2010062724 A3 | 6/2010 |
| WO | 2012074647 A2 | 6/2012 |
| WO | 2012074647 A3 | 6/2012 |

OTHER PUBLICATIONS

International Search Report, PCT/US2011/058496, Jun. 26, 2012, Patent Cooperation Treaty International Searching Authority, Korean Intellectual Property Office, Daejeon Metropolitan City, Republic of Korea.

Introducing GEA Westfailia Separator ecoforce, Nov. 5, 2012, GEA Mechanical Equipment US, Inc. Northvale, NJ.

Russel Finex Liquid/Solid Separator, Feb. 18, 2011, Russell Finex Ltd. Feltham, England.

AFPX 517, Jun. 13, 2007, Alfa Laval Corporate AB , Sweden.

HydroTwister dynamic vortex separator, Steinhardt Water Technology Systems, Accessed on the Internet at: http://steinhardtgmbh.com/separating/hydrotwister-dynamic-vortex-separator-compact-and-energy-free/ on Nov. 17, 2012.

Animal manue solid liquid separator with best quality, Zhengzhou Mahaco Trading Co., Ltd., China, accessed on the Internet at: http://www.alibaba.com/product-gs/605253719/Animal_manure_solid_liquid_separator_with.html on Nov. 20, 2012.

Wastewater treatment solid liquid cyclone separator high speed centrifuge, Chengdu Wes Petroleum Equipment Co., Ltd., accessed on the Internet at: http://www.alibaba.com/product-gs/655735867/wastewater_treatment_solid_liquid_cyclone_separator.html on Nov. 16, 2012.

Image accessed on the Internet at: http://www.emeraldinsight.com/content_images/fig/0240200504001.png on Nov. 16, 2012 (Published May 2000).

"Wastewater Treatment Process", Image accessed on Internet at: http://www.phillyh2o.org/backpages/MSB_DRAINAGE2/MSB_DRAINAGE.htm on Nov. 16, 2012.

Sanitation Districts of Los Angeles County, Wastewater Treatment and Reclamation, accessed on the Internet at: http://www.lacsd.org/wastewater/wwfacilities/moresanj.asp on Nov. 16, 2012, estimated publication date according to Google is Jun. 7, 2012.

How the Sewer System Works, Feb. 22, 2012, Massachusetts Water Resources Authority, Massachusetts, US, accessed on the Internet at: http://www.mwra.state.ma.us/03sewer/html/sewhow.htm on Nov. 16, 2012.

* cited by examiner

WASTEWATER CONCENTRATOR METHOD AND SYSTEM

This application is a continuation in part of International Patent Application PCT/US2011/058496 with an international filing date of Oct. 30, 2011, now, which is a continuation in part of U.S. patent application Ser. No. 12/954,809, filed on Nov. 26, 2010, now U.S. Pat. No. 8,066,887.

BACKGROUND

The invention relates to wastewater transport, treatment and processing systems.

Wastewater occurs whenever a foreign substance is added to water that is not considered to add positive value to the water. The water is the carrier for these undesirable components, such as silt, dirt, ionic species, chemicals and sanitary fecal material. The water can be re-purified, removing the contaminants by mechanical, chemical or biological means.

Sanitary wastewater as it enters a biological treatment plant contains 1.5%-2.0% of suspended solids that are mostly consumed by bacteria in the reaction vessel. The remaining solids, or sludge is carried off and disposed of. The wastewater suspended solids are often referred to as the Biological Oxygen Demand (BOD). This number is roughly 250-mg/liter for raw sanitary wastewater. A four member household can typically produce 550-750 liters per day of sanitary wastewater. In addition to the suspended solids (BOD), 125-150 mg/liter of total dissolved solids (TDS) are added. As an illustrative example, if water were to enter a household with 300 mg/liter of TDS, the same water will leave the household at 425-450 mg/liter TDS. Therefore, the water leaving the home is "carrying off" human waste, soap and other materials from the shower, laundry, kitchen, and other drainage pipes carrying household wastewater.

The wastewater from residential homes and other dwellings as well as restaurants, hotels, schools, and other commercial buildings finds its way to a wastewater or sewage treatment plant via forced (pumped) or gravity piping systems. This wastewater collection piping system is often referred to as a sewer main.

The wastewater treatment plant can be configured in numerous ways with strainers, settling basins, biological reactors and filters. The primary goal is to reduce the BOD to less than <5 in the treated wastewater. The water is then further treated and often used for irrigation, or returned to deep wells, rivers or other bodies of water.

Municipal wastewater treatment plants at the time of their construction are often designed for projected future urban growth. Years after their construction, they are often expanded, as required, to satisfy actual urban growth demand. Similarly, wastewater collection piping systems are designed to handle a given quantity of wastewater based on projected demand. For the purpose of this disclosure, the term "wastewater loading" is defined as a quantity of wastewater flowing through a sewer main per unit time. Also for the purpose of this disclosure, the term "solids loading" is defined as a quantity of solids (i.e. matter with specific gravity greater than one) per unit volume, contained in the wastewater in a sewer main.

In growing cities and suburbs, many of the wastewater collection piping systems are overloaded or will be overloaded in the future with not enough capacity to handle the demand for wastewater flow. Those skilled in the art have devised several ways to remedy this situation. One solution is to lay parallel pipes or replace the current pipes with larger pipes to accommodate the additional wastewater loading. Another solution is to build additional waste treatment facilities to handle the additional loading. Both solutions can be expensive to implement. In addition, replacing or adding new pipe can be disruptive to a large portion of the neighborhoods and roads where the new pipes are being laid.

In addition, wastewater treatment plants in growing cities and suburbs often require expanded capacity. One problem faced is that some wastewater treatment plants do not have the physical space to expand capacity without disturbing the surrounding area.

For the forgoing reasons, there is a need for a method, system or apparatus that can meet the need of expanding capacity of overburdened wastewater-piping systems or overburdened wastewater treatment plants with minimum disruption.

SUMMARY

This Summary introduces a selection of concepts in simplified form that are described the Description. The Summary is not intended to identify essential features or limit the scope of the claimed subject matter.

The present invention is directed to a method, system, and apparatus that satisfy this need of adjusting the wastewater loading in a wastewater in either a wastewater collection system or within a wastewater treatment plant in order to increase the system capacity.

An area of focus in the art has been to increase the system capacity by either increasing the volume capacity of the piping system by using larger pipes or parallel pipes in combination with increasing the capacity of the wastewater treatment plants. The inventor made the following observation. Wastewater treatment plants are often capable of handling a much higher amount of total suspended solids in the wastewater. The inventor also observed that there are potential benefits having higher suspended solids in the wastewater. For example, the biological treatment plant would operate a lot more efficiently if the suspended solids (BOD) to wastewater ratio or suspending solids (BOD) loading is increased. In many cases, the inventor estimates, the BOD loading could be doubled without increasing the plant capacity.

Based on this observation, a system and method in accordance with principles of the invention, can increase the effective volume (suspended solids loading) capacity of a wastewater piping collection system without the need to use larger pipes or adding additional parallel pipes. To accomplish this, in one embodiment, in accordance with the principals of the invention, a system located remotely from the wastewater treatment plant, diverts a portion of the wastewater from the wastewater piping collection system, or sewer main, separates the solid from the liquid, treats the recovered water for use locally, or for disposal, and reintroduces the solids, i.e. the separated or "concentrated solids", back into the main sewage line that adjusts the wastewater loading of the wastewater piping collection system dynamically to below a preset quantity or within a preset range. The preset quantity or predetermined amount, in one embodiment, can be based on predetermined solids to liquid ratio or alternatively on a desirable level of wastewater loading in the wastewater piping system or both. It can also be based on more complex ratios.

As a result, this system reduces the volume of water flowing through the piping system and increases the percent of concentrated solids and BOD. A number of these systems can be strategically placed around an urban and sub-urban area in order to increase the effective capacity of the wastewater treatment piping system without the need for new pipes. The liquid, which in one embodiment can be treated by mechanical, electrical, or chemical means alone or in combination can be used locally for landscape or crop irrigation, or in another embodiment, can be used as potable water. In further embodiments, can be used as industrial water, for example, boiler feeds makeup or other industrial process applications. In an alternative embodiment, the liquid can be treated, for example, by electrical, chemical, thermal, or mechanical means alone or in combination, and be disposed of, for example, by pumping it into the ground, or by diverting the treated liquid into bodies of water, for example, rivers, streams, lakes, or the ocean.

In an embodiment, systems and methods disclosed can be applied to increase system capacity within the wastewater treatment plant itself. A portion of wastewater from within the wastewater treatment plant can be diverted from the feed path between the wastewater plant inlet and the biological treatment stage. A separator, such as separator using centrifugal force, separates the solid from the liquid. The liquid can be treated and reused, for example, as gray water for irrigation. The liquid can also be disposed of; for example, by treating and then pumping into the ground, or by treating and dissipating into a body of water. The solids, which are now concentrated, are reintroduced into the feed path of the biological treatment stage downstream from where the wastewater was diverted. The system dynamically and jointly adjusts a rate at which the solids are reintroduced and a rate at which the wastewater is diverted, the dynamically jointly adjusting is carried out in such a way that the quantity of wastewater flowing into the biological process stage per unit time (i.e. the hydraulic loading flowing into the biological process stage) downstream of the diverting is adjusted within a preset range, or alternatively is kept below a preset level.

There are components of wastewater that have specific gravity less than 1.0. It may be desirable to reintroduce these components back into the main flow with the separated or concentrated solids. The main flow, for the purpose of this disclosure, refers to the sewer main, for a wastewater concentrator located remotely from a wastewater treatment plant. For a wastewater concentrator located within the wastewater treatment plant, for the purpose of this disclosure, the main flow refers to the main processing flow path between the wastewater treatment plant inlet and the first biological treatment stage. There are centrifugal separators that are capable of separating the input stream into three components, solids, liquid, and lighter oils. The output stream of lighter oils can be combined with the solids stream and reintroduced back into the main flow.

Alternatively, a two component solid-liquid centrifugal separators, such as vortex or cyclone separators, can be used with the following process to eject both lighter than water and heaver than water components back into the main flow. Polymers are injected into the diverted wastewater before the centrifugal separator. Lighter than water components are bound to the heaver than water components by the polymers. The centrifugal separator ejects both the solids and bound lighter than water components. The system dynamically and jointly adjusts a rate at which the solid and bound substance mixture are reintroduced and a rate at which the wastewater is diverted, the dynamic joint adjusting is carried out in such a way that the quantity of wastewater flowing per unit time downstream of the diverting is adjusted within a preset range, or alternatively is kept below a preset level.

DRAWINGS

These and other features, aspects, and advantages of the present invention will become better understood with regard to the following description, appended claims, and accompanying drawings where:

DESCRIPTION

Figure 1:
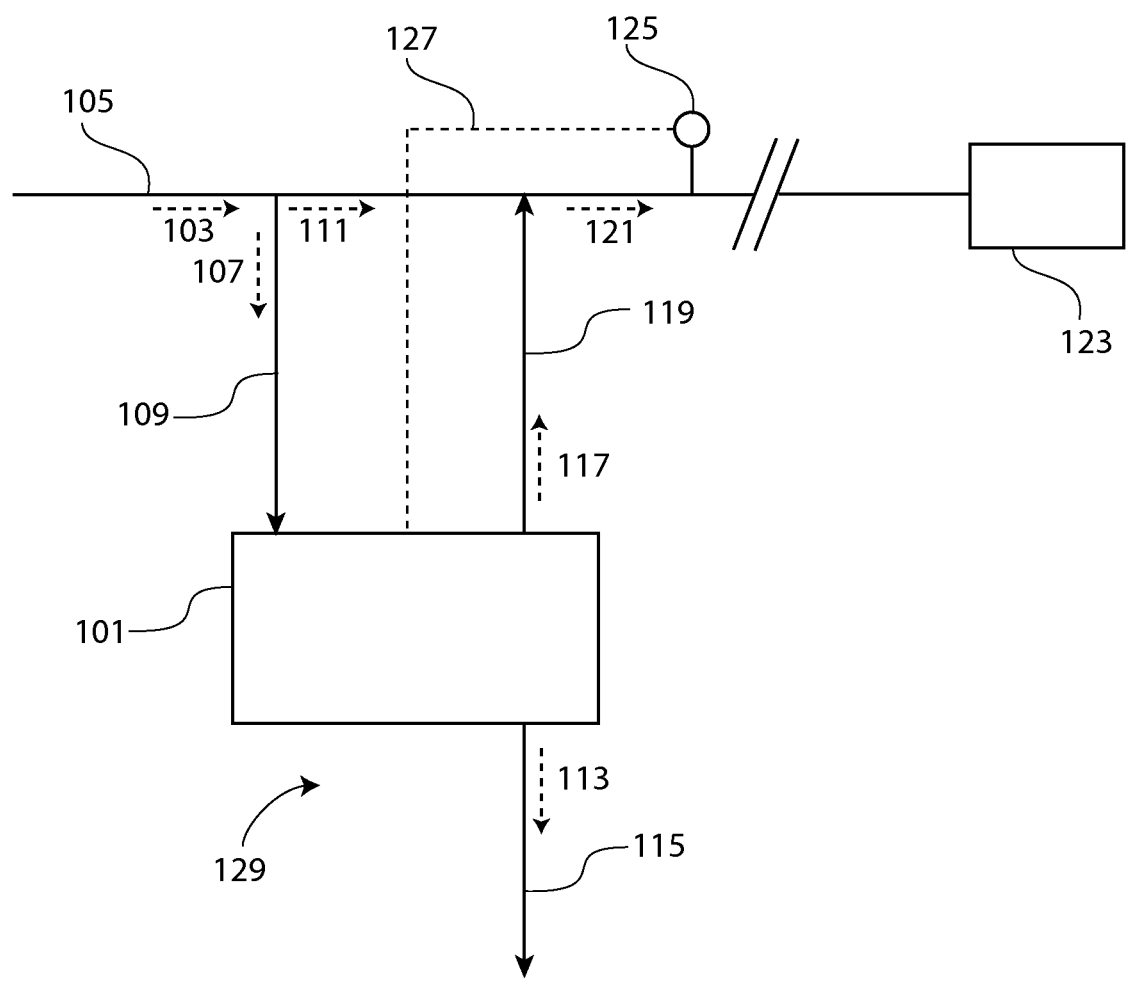
FIG. 1 shows a high-level system diagram of a wastewater concentrator system in accordance with principles of the invention.

Referring now to the drawings in detail wherein like numerals indicate like elements throughout the several views, FIG. 1 illustrates a system diagram of a wastewater concentrator system 101 in accordance with the principles of the invention. In one embodiment, raw wastewater 103 flows through the sewer main 105. A portion of the diverted raw wastewater 107 is diverted from the sewer main 105 through an inlet pipe 109 into the wastewater concentrator system 101. The non-diverted wastewater 111 remains in the sewer main 105. In accordance with principles of the invention that will be described, the wastewater is separated into separated liquid 113 through an outlet pipe 115 and concentrated solids stream 117 through a second outlet pipe 119. The separated liquid 113 can be diverted for local reuse. In one embodiment, the separated liquid 113 is mostly water but may contain BOD or dissolved solids. This can be pumped deep into the ground in order to facilitate natural filtration. In accordance with local environmental or governmental regulations, the separated liquid 113 can be further purified before pumping into the ground. In another embodiment, the separated liquid 113 is further purified and sterilized and can be used for agricultural or commercial irrigation or for drinking water. In an alternative, embodiment, the separated liquid 113 can be further purified and disposed of into a body of water. For the purpose of this disclosure, the term "body of water" can refer to natural or man-made bodies of water, for example, oceans, seas, lakes, basins, or ponds as well as natural or man-made waterways, for example, rivers, streams, or canals. In another embodiment, the separated liquid 113 can be further purified and used for cooling tower makeup water or for other industrial processes.

The separated liquid 113 can be treated either for reuse or for disposal, for example, by electrical, chemical, thermal, or mechanical means alone or in combination. Electrical means can include, for example, UV light, electrically produced ozone, and electro-dialysis. Chemical means can include, for example, chlorination and other chemical disinfectants. Thermal means can include, for example, pasteurization, boiling, distillation, or solar heating. Mechanical means can include, for example, media or multi-media filtration, membrane filtration, cartridge filtration, and aeration. The above examples are meant to be exemplary and not limiting, other means of electrical, chemical, thermal, and mechanical means are possible.

The concentrated solids stream 117 in the second outlet pipe 119 are reintroduced in the sewer main 105. The concentrated solids stream 117 are combined with the non-diverted wastewater 111 to form concentrated wastewater 121 in the sewer main. The resulting concentrated wastewater 121 has increased suspended solids. A portion of wastewater has been removed from the sewer main 105 that is approximately equal to the separated liquid 113 diverted through the outlet pipe 115. This has the effect of increasing the system capacity of the sewer main 105 by an amount equal to the separated liquid 113. By increasing the system capacity of the sewer main 105 in this way, the wastewater loading of the sewer main 105 has been effectively been decreased.

In accordance with principals of the invention, the wastewater loading of sewer main 105 is adjusted to a pre-determined level or pre-determined amount. This pre-determined amount may be set in accordance with a number of factors. For example, the pre-determined level may be set in order to make sure that the sewer main 105 is not over loaded during peak capacity. Similarly, the pre-determined level may be set in order to assure that the wastewater treatment plant 123 supplied by the sewer main 105 is not over loaded during peak demand. In one embodiment, a flow transmitter 125 determines the rate of flow of the concentrated wastewater 121 in the sewer main 105. The flow transmitter 125 communicates with the wastewater concentrator system 101 through a first signal path 127. This information transmitted through the signal path can take many alternative forms, for example, analog voltage, or a digital signal. This may be either through wire or by wireless means.

One advantage of this wastewater concentrator system 101 is that it may be located where it is most needed. It may be desirable for the wastewater concentrator location 129 to be in an area of high-depend where the sewer main 105 capacity is challenged. This may be in an urban or sub-urban area far away from the wastewater treatment plant 123. Under other circumstances, where the demand on the system is more uniform, it may be desirable to locate the wastewater concentrator location 129 may be right outside of the wastewater treatment plant 123.

Figure 2:
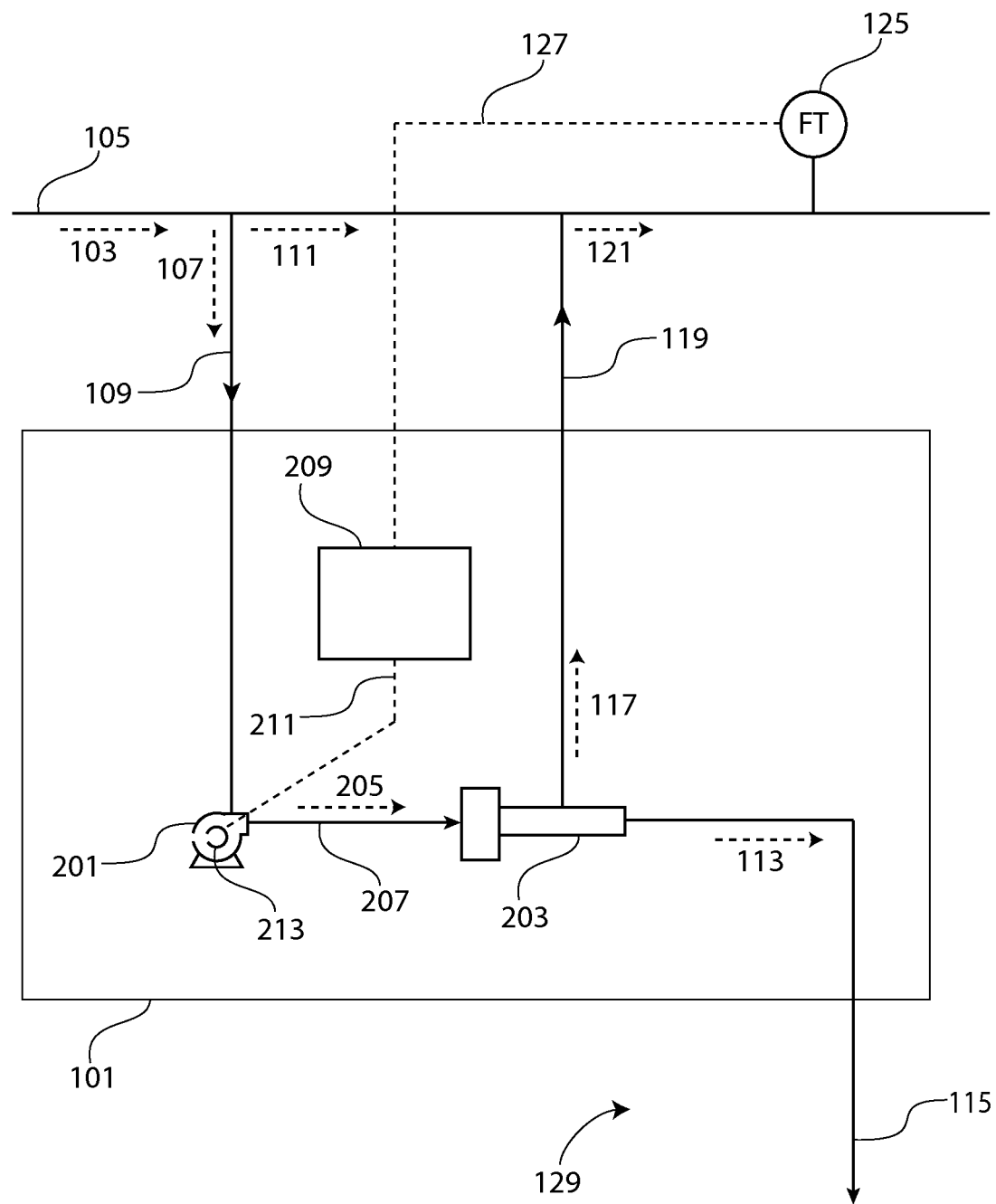
FIG. 2 shows a more detailed system diagram of the wastewater concentrator system of FIG. 1.

FIG. 2 is an embodiment, in accordance with principals of the invention, of FIG. 1. The diverted raw wastewater 107 flows through the inlet pipe 109 to a feed pump 201. The feed pump 201 supplies a cyclone or vortex separator 203 post-feed pump wastewater 205 through feed pipe 207. The feed pump 201 may be any pump capable of being controlled with a variable rate of flow and capable of supplying net positive suction pressure to the vortex separator 203. For example, in one embodiment the feed pump 201 is a centrifugal feed pump. In another embodiment, the feed pump 201 is a centrifugal grinder pump. A grinder pump takes larger solid objects, for example, rags, condoms, tampons, or sanitary napkins, grinds or macerates them into smaller particulates. In another embodiment, the feed pump 201 and vortex separator 203 may be combined into one unit that performs the function of both feed pump and vortex separator.

In FIG. 2, the vortex separator 203 takes the post-feed pump wastewater 205 and separates it into concentrated solids stream 117 that flow through the second outlet pipe 119 and separated liquid 113 that flows through the outlet pipe 115. The vortex separator 203 uses centrifugal force to spin the wastewater forcing the heavier materials to the outside periphery of a containment pipe. The separated liquid 113, which is mostly water, with a lower specific gravity, lighter, stays to the center of the containment pipe as the solution is flowing downstream in the containment pipe. The concentrated solids exit at the periphery of the containment pipe through the second outlet pipe 119, while the mostly water or separated liquid 113 is drawn off of the center of the end of the containment pipe though the outlet pipe 115. In one embodiment, the vortex separator 203 used is sold under the trade name "voraxial separator" and sold by Enviro Voraxial Technology Inc. In another embodiment, the vortex separator 203 is combined with feed pump 201.

The basic principles of a vortex separator 203 are taught by U.S. Pat. No. 5,084,189 (Richter). The separator includes an impeller mechanism with a hollow core and a decreasing axial pitch in the direction of fluid flow. The combination of hollow core and axial pitch of the impeller mechanism creates a vortex or cyclone where lighter material stays in the center of the vortex where heavier material is force to the periphery.

Figure 3:
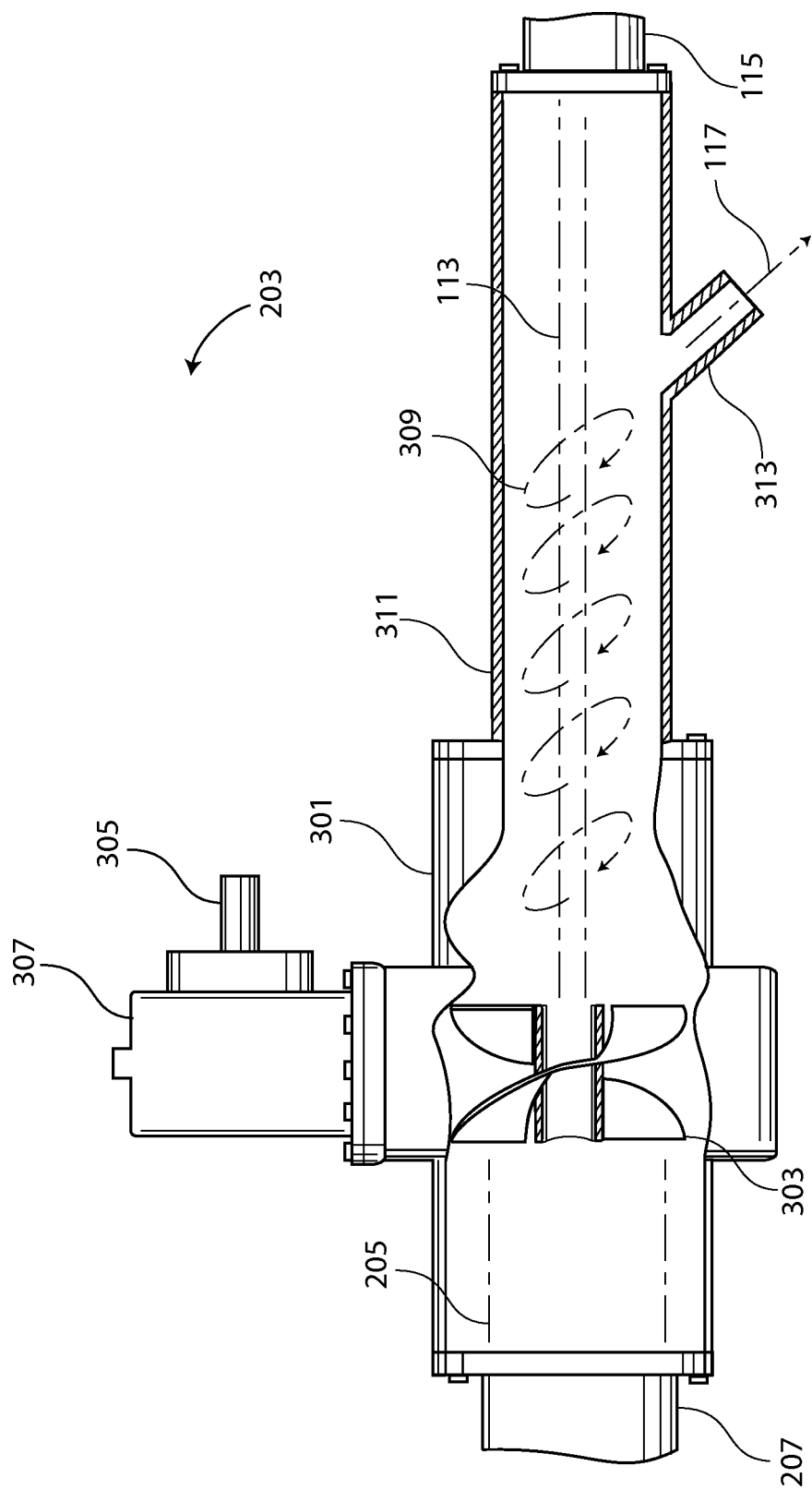
FIG. 3 shows an embodiment of a vortex separator using centrifugal force for separating the concentrated solids and liquid wastewater.

FIG. 3 illustrates in more detail one example of a vortex separator 203. The vortex separator 203 includes a housing 301. Within the housing 301 are impellers 303. The impellers 303 have hollow cores and a decreasing axial pitch in the direction of fluid flow. The impellers are driven by a drive shaft 305 attached to a gear box 307. Other pump arrangements for driving the impellers 303 are also possible. The housing 301 is coupled to a discharge assembly or separation containment pipe 311. This discharge assembly includes the containment pipe as described in a previous paragraph of this disclosure. The impeller pitch and hollow core impeller center create an outer portion of the vortex 309 with the concentrated solids stream 117, which are heavier, being forced to the periphery and lighter water being contained in as a separated liquid 113 in the center of the vortex or cyclone. The concentrated solids stream 117 are taken off the outside periphery of the separating column. The concentrated solids contained in the outer portion of the vortex 309 exits the separation containment pipe 311 through a solids discharge port 313 as a concentrated solids stream 117. The separated liquid 113 is removed through the outlet pipe 115. The solids discharge port 313 is angled in the direction and pitch of the cyclone in order to more effectively separate the concentrated solids.

Referring again to FIG. 2, the flow transmitter 125 measures the rate of flow of the concentrated wastewater 121 in the sewer main 105 and communicates this information through a first signal path 127 to a control system 209. The control system 209 controls the speed of the feed pump 201 in order to adjust the rate of flow of diverted raw wastewater 107 in the inlet pipe 109 and to the vortex separator 203. In one embodiment, a variable frequency drive or VFD 213 controls the feed pump 201 through a second signal pathway 211. The second signal path way can be, for example, an analog drive current, or digital signal or analog voltage and may be wired or wireless.

The control system 209 controls the rate of flow of the feed pump 201 in order to adjust the wastewater loading of the sewer main 105 to the pre-determined level or pre-determined amount. In one embodiment, the control system 209 uses an algorithm similar to the one shown in FIG. 4, to adjust the wastewater loading of the sewer main 105 to the pre-determined amount. The post system wastewater loading is determined 401 and compared 403 to the pre-determined amount or target wastewater loading 405. In one embodiment, if the post system wastewater loading 401 is less than the target wastewater loading 403 than the rate of flow is decreased 407, if the post system wastewater loading 401 is greater than the target wastewater loading 405, than the rate of flow is increased 409, and if the post system wastewater loading 401 is approximately equal to target wastewater loading 405, than the rate of flow is not adjusted 411. The algorithm loops back 413 to determine pre-system wastewater loading step 401 and repeats again.

In an alternate embodiment, the target wastewater loading 405 is not a specific value but a range of values. This pre-set range can be set in order to enhance stability of the feedback control system and the life of the variable frequency drive. The rate of flow would be decreased 407 if the post-system wastewater loading 401 was less than the pre-set range, increased rate of flow 409 would occur if the post-system wastewater loading 401 was greater than the pre-set range, and steady rate of flow 411 would continue if the post-system wastewater loading was within the pre-set range.

Figure 4:
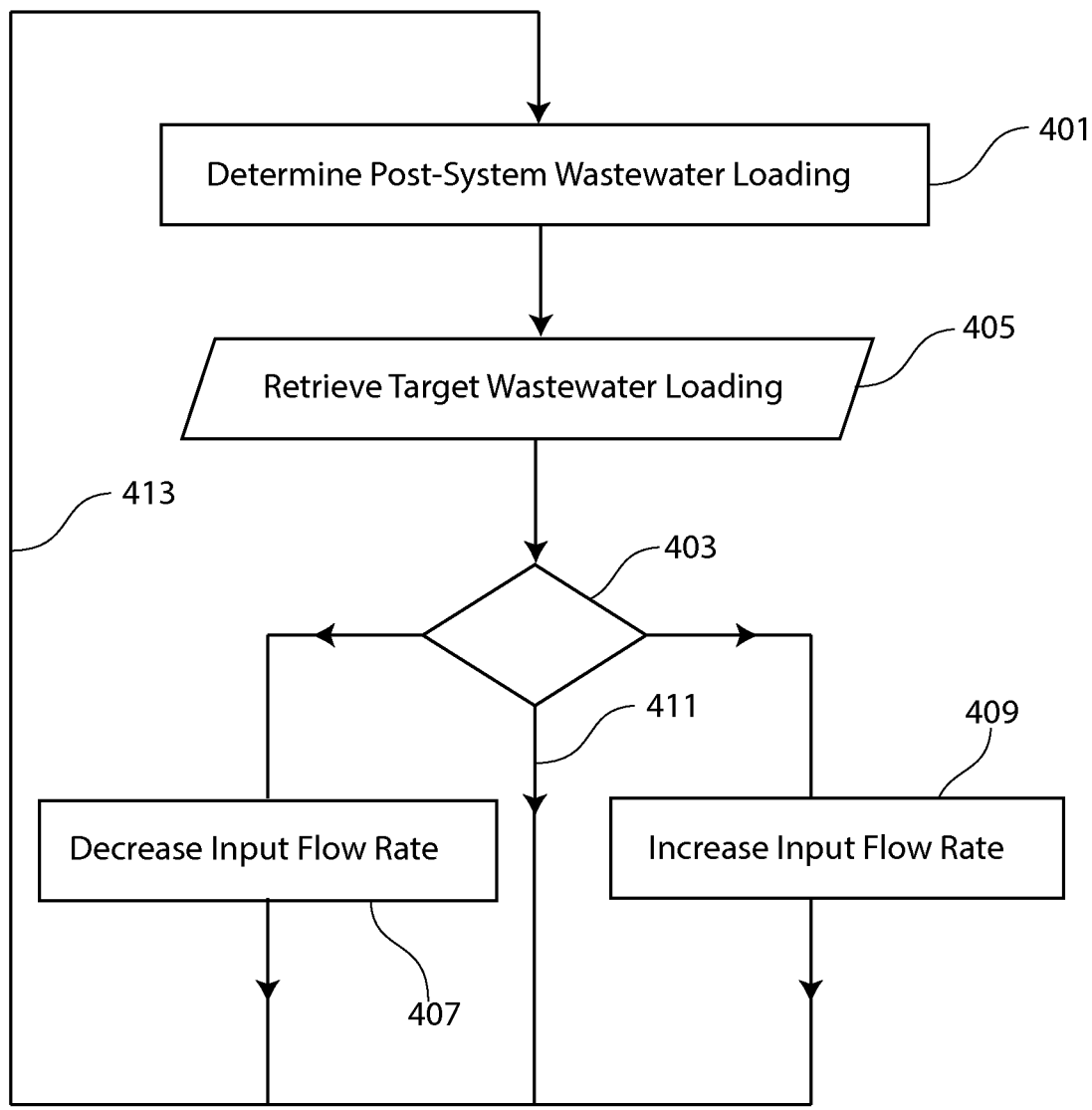
FIG. 4 shows a flow chart diagram in accordance with principles of the invention for controlling the wastewater loading in sewer main.

Referring to both FIG. 4 and FIG. 2, determining the post system wastewater loading 401 in the control system 209 is facilitated by data from the flow transmitter 125. The control system 209 compares the target wastewater loading 405 to the post system wastewater loading 401 and either adjusts directly or generates a signal to control the VFD 213 in order to control the rate of flow. If the post system wastewater loading 401 of the sewer main 205 is too high, then the VFD 213 speed is increased in order to increase the rate of flow to generate more separated liquid 113 and divert more wastewater from the sewer main 105. If the post system wastewater loading 401 of the sewer main 105 is too low, then the VFD 213 speed is decreased in order to decrease the rate of flow to generate less separated liquid 113 and divert less wastewater from the sewer main.

The target wastewater loading 405, in one embodiment is loaded into either program or data storage memory in the control system 209. Optionally, the target wastewater loading 405 level may be adjusted on-site at the wastewater concentrator or remotely. For example, it can be updated through wired or wireless means such USB, 802.11, Ethernet, 3G or other standard communication protocol.

This algorithm of FIG. 4 can be stored in the form of program instructions, for example, in a memory device connected to or internal to a microcontroller or microprocessor, a programmable logic device, a remote personal computer (PC) controlling the control system 209, and executed by any combination of these devices.

Figure 5:
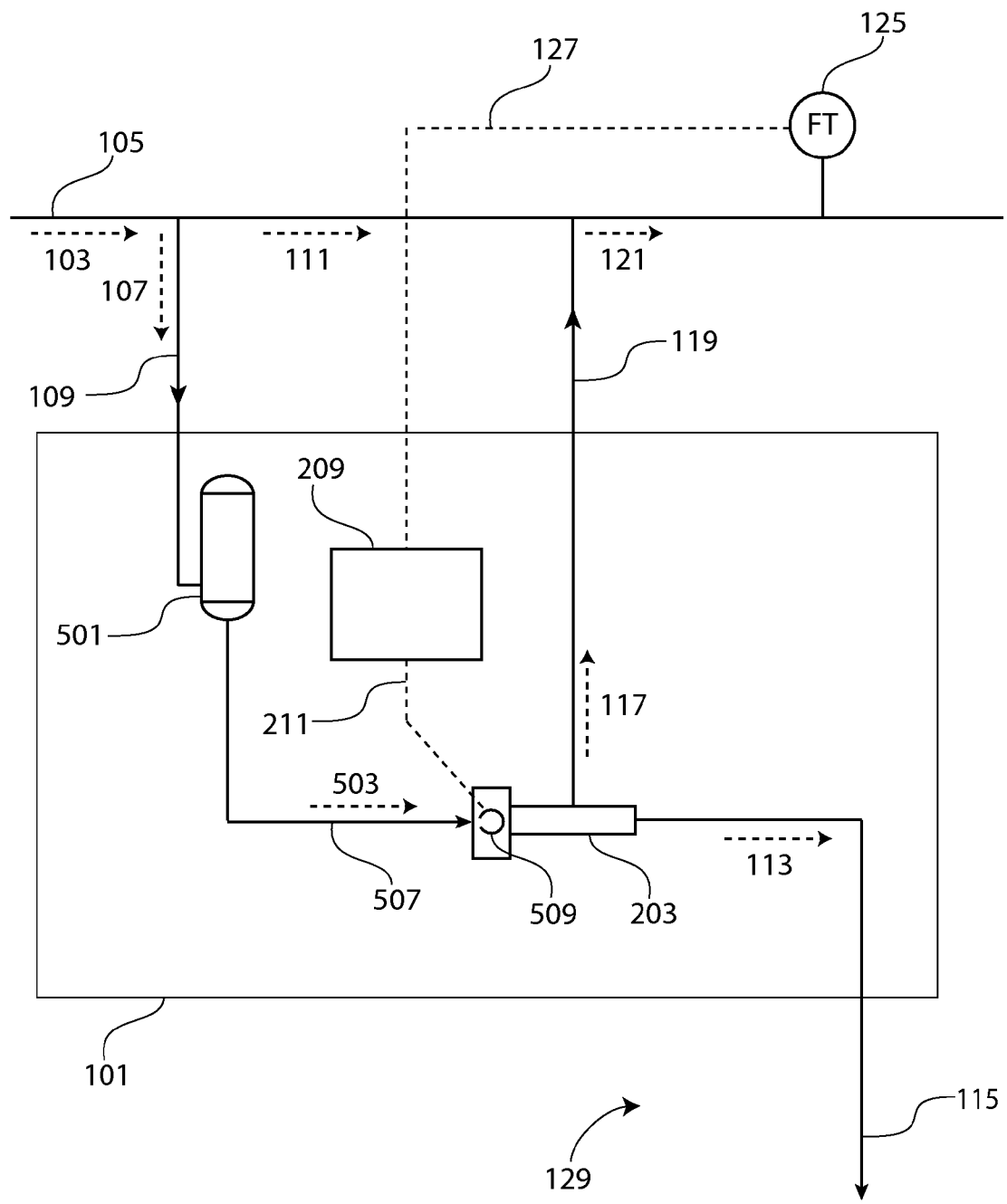
FIG. 5 shows a system diagram of a wastewater concentrator system of FIG. 1 where the vortex separator is fed by a head tank.

When there is sufficient pressure created in the inlet of the vortex separator 203, for example, by a gravity feed, a feed pump 201 as shown in FIG. 2 may not be necessary. FIG. 5 shows an alternative embodiment where an elevated tank or head tank 501 supplies diverted wastewater 503 through a pipe 507 to the vortex separator 203. A VFD 509 is attached to the vortex separator 203. Varying the speed of the VFD 509 attached to the vortex separator 203 controls the amount of wastewater diverted 107 from the sewer main 105.

Referring to both FIG. 4 and FIG. 5, the control system 209 controls the rate of flow of the VFD 509 attached to the vortex separator 203 in order to adjust the wastewater loading of the sewer main 105 to the pre-determined level or pre-determined amount. As previously described, the control system 209 uses an algorithm similar to the one shown in FIG. 4, to adjust the wastewater loading of the sewer main 105 to the pre-determined amount. The control system 209 compares the target wastewater loading 405 to the post system wastewater loading 401, for example, provided by flow transmitter 125, and either adjusts directly or generates a signal to control the VFD 509 attached to the vortex separator 203 in order to adjust the rate of flow. If the post system wastewater loading 401 of the sewer main 205 is too high, then the VFD 509 speed is increased in order to increase the rate of flow to generate more separated liquid 113 and divert more wastewater from the sewer main 105. If the post system wastewater loading 401 of the sewer main 105 is too low, than then the VFD speed is decreased in order to decrease the rate of flow to generate less separated liquid 113 and divert less wastewater from the sewer main.

It may be desirable to adjust the wastewater concentrator system 101 to a pre-determined solids loading instead of a pre-determined wastewater loading, for example, when it is known that the wastewater concentrator system 101 has the potential to overload the solids loading capacity of the wastewater treatment plant 123.

Figure 6:
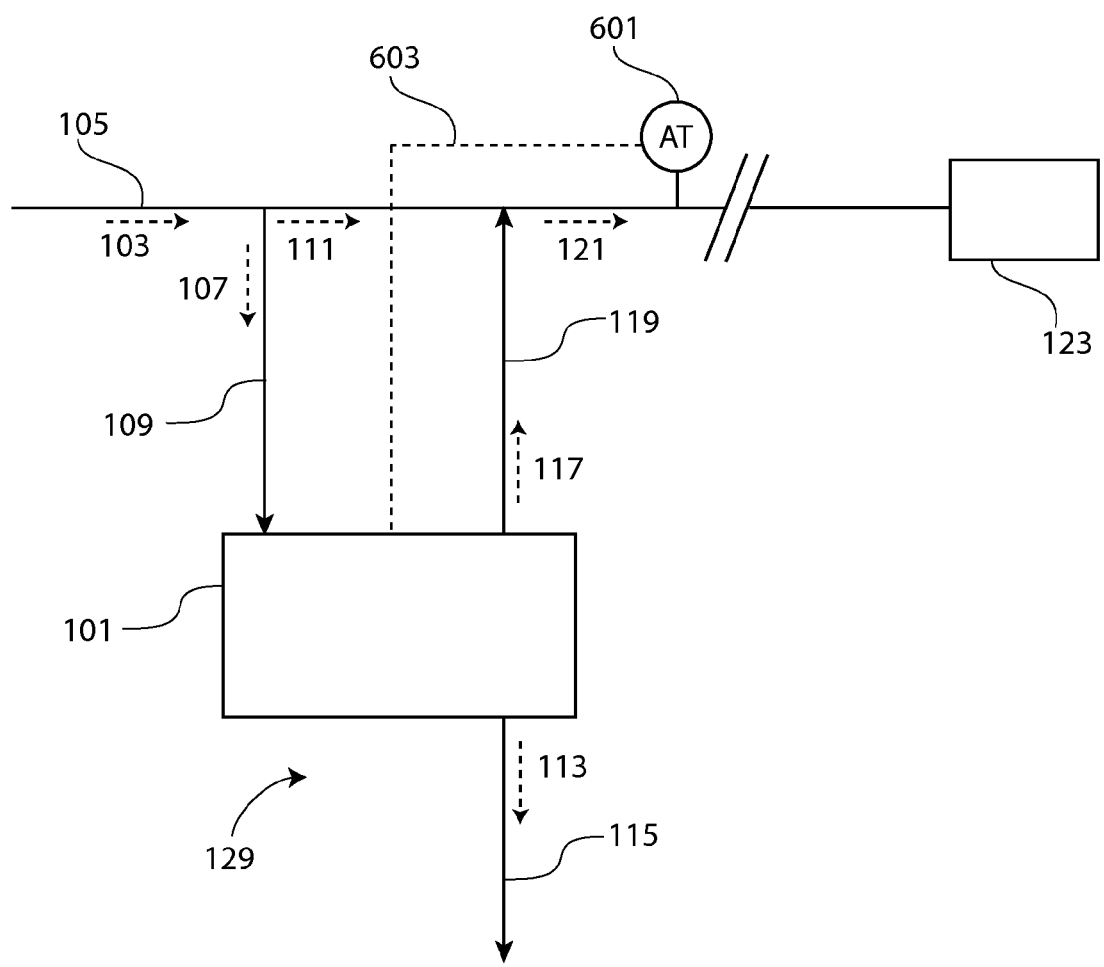
FIG. 6 shows a high-level system diagram of a wastewater concentrator system that adjusts solids loading in a sewer main to a pre-determined amount.

FIG. 6 shows a high-level system diagram of a wastewater concentrator system 101 that is adapted to adjusting the solids loading to a pre-determined amount. Like the embodiment shown in FIG. 1, a portion of the diverted raw wastewater 107 is diverted from the sewer main 105 through an inlet pipe 109 into the wastewater concentrator system 101. In a manor previously disclosed, wastewater is separated into separated liquid 113 through a outlet pipe 115 and concentrated solids stream 117 through a second outlet pipe 119. The separated liquid 113 can be diverted for local reuse or for disposal. The concentrated solids stream 117 in the second outlet pipe 119 are reintroduced in the sewer main 105. The concentrated solids stream 117 are combined with the non-diverted wastewater 111 to form concentrated wastewater 121 in the sewer main. The resulting concentrated wastewater 121 has increased suspended solids. A portion of wastewater has been removed from the sewer main 105 that is approximately equal to the separated liquid 113 diverted through the outlet pipe 115. This has the effect of increasing the system capacity of the sewer main 105 by an amount equal to the separated liquid 113 and also increasing the solids loading in the concentrated wastewater 121.

In accordance with principals of the invention, the solids loading of sewer main 105 is adjusted to a pre-determined level or pre-determined amount. The pre-determined amount, for example, may be selected to assure that the wastewater treatment plant 123 operates within its solids loading capacity. In one embodiment, a solids analyzer 601 determines the solids loading of the concentrated wastewater 121 in the sewer main 105. The solids analyzer 601 communicates with the wastewater concentrator system 101 through a signal pathway 603. This information transmitted through the signal pathway 603 can take many alternative forms, for example, analog voltage, or a digital signal. This may be either through wire or by wireless means.

Figure 7:
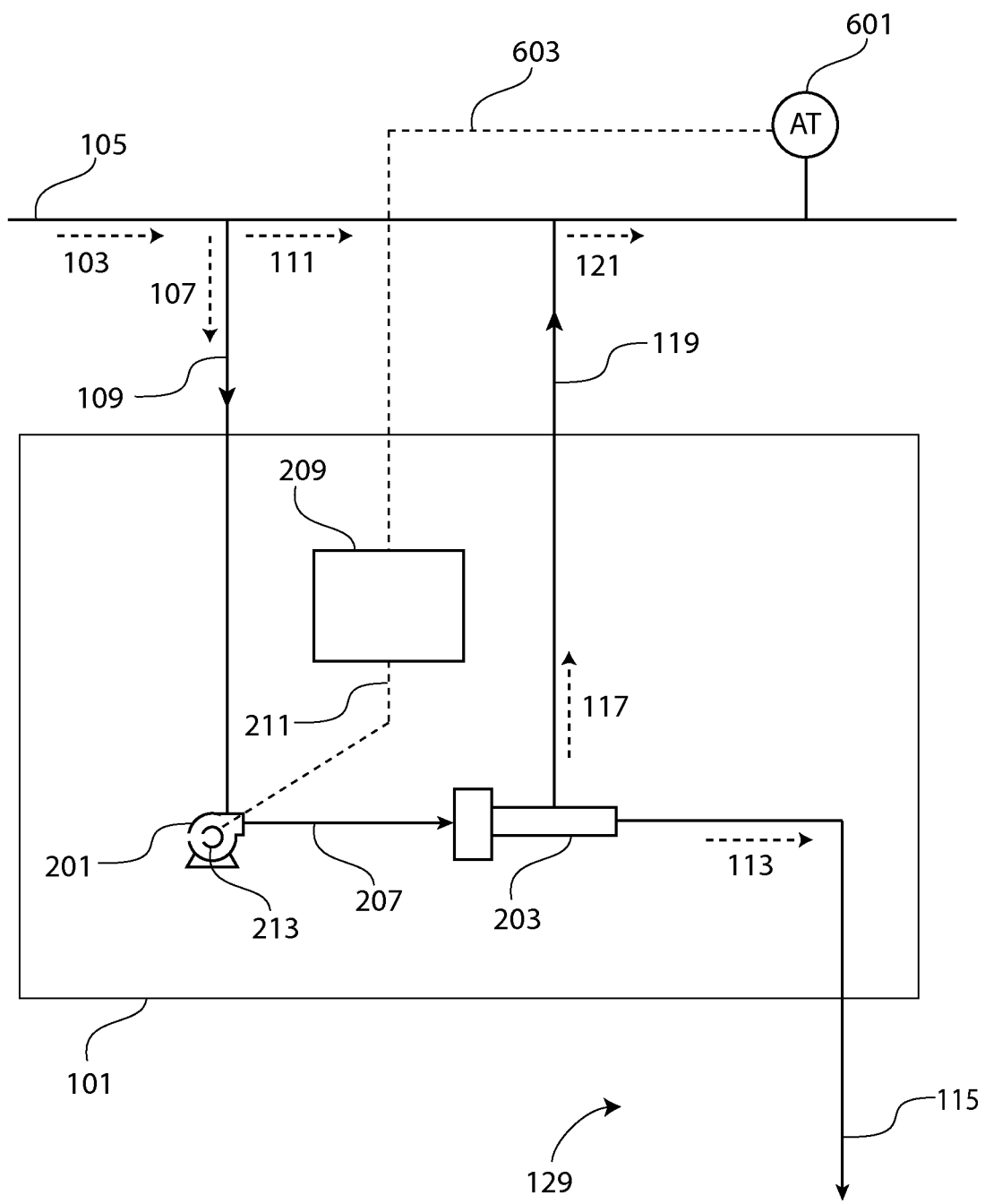
FIG. 7 shows a more detailed embodiment of FIG. 6.

FIG. 7 is an embodiment, in accordance with principals of the invention, of FIG. 6. The embodiment of FIG. 7 operates in a similar manner as the embodiment of FIG. 2 except in the present embodiment the control system 209 controls the VFD 213 of the feed pump 201 in order to adjust the solids loading to a pre-determined amount rather than the solids loading.

The solids analyzer 601 measures solids loading of the concentrated wastewater 121 in the sewer main 105 and communicates this information through the signal pathway 603 to a control system 209. The control system 209 controls the speed of the feed pump 201 in order to adjust the rate of flow of diverted raw wastewater 107 in the inlet pipe 109 and to the vortex separator 203. In one embodiment, a variable frequency drive or VFD 213 controls the feed pump 201 through a second signal pathway 211. The signal pathway 603 can be, for example, an analog drive current, or digital signal or analog voltage and may be wired or wireless.

The control system 209 controls the rate of flow of the feed pump 201 in order to adjust the solids loading of the sewer main 105 to the pre-determined level or pre-determined amount. In one embodiment, the control system 209 uses an algorithm similar to the one shown in FIG. 8, to adjust the post system solids loading of the sewer main 105 to the pre-determined amount. The post system solids loading 801 is determined and compared 803 to the pre-determined amount or target solids loading 805. In one embodiment, if the post system solids loading 801 is greater than the target solids loading 803 than the rate of flow is decreased 807, if the post system solids loading 801 is less than the target solids loading 805, than the rate of flow is increased 809, and if the post system solids loading 401 is approximately equal to target solids loading 805, than the rate of flow is not adjusted 811. The algorithm loops back 813 to determine pre-system wastewater loading step 801 and repeats again.

In an alternate embodiment, the target solids loading 805 is not a specific value but a range of values. This pre-set range can be set in order to enhance stability of the feedback control system and the life of the variable frequency drive. The rate of flow would be decreased 807 if the post-system solids loading 801 was greater than the pre-set range, increased rate of flow 809 would occur if the post-system solids loading 801 was less than the pre-set range, and steady rate of flow 811 would continue if the post-system solids loading was within the pre-set range.

Figure 8:
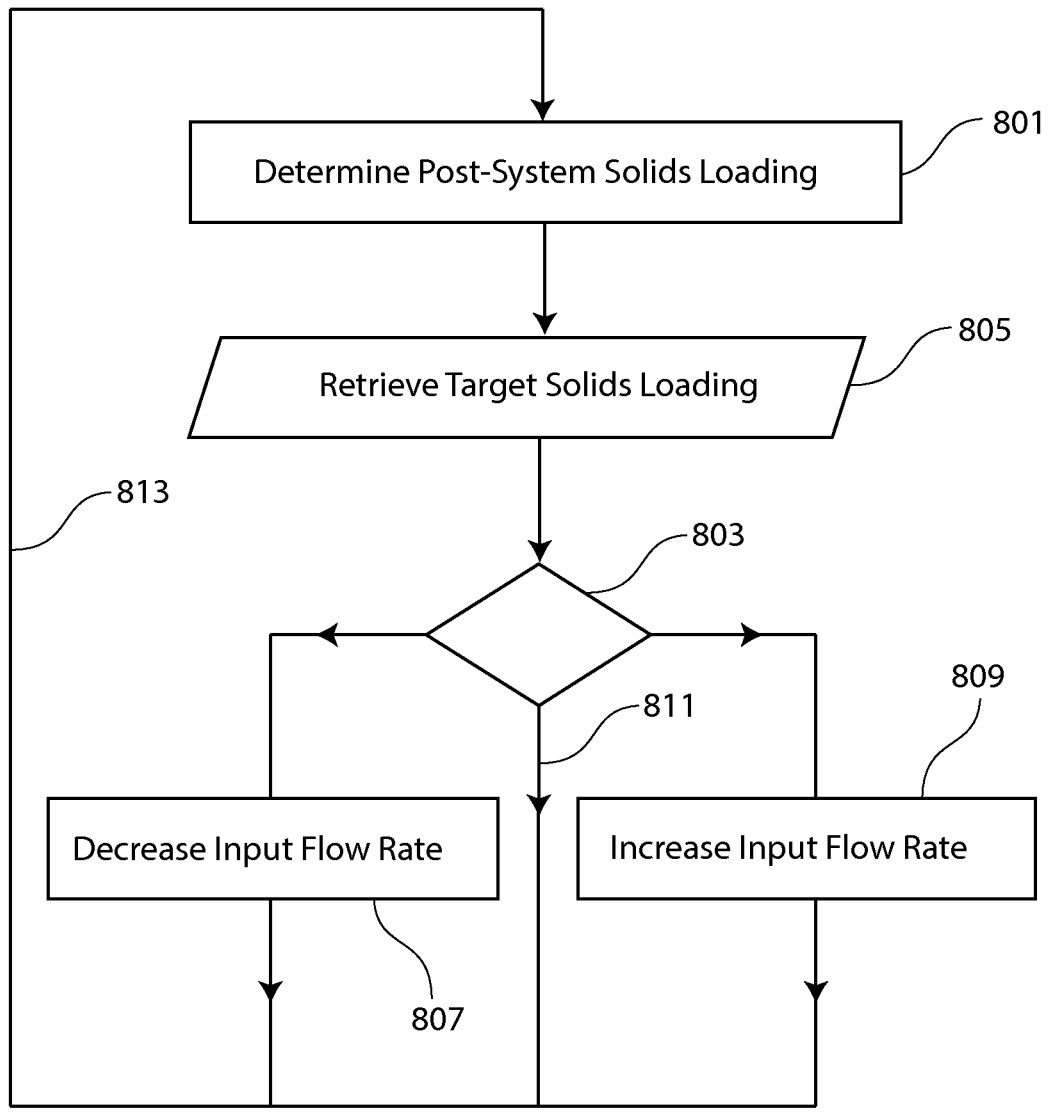
FIG. 8 shows a flow chart diagram in accordance with principles of the invention for controlling solids loading in a sewer main.

Referring to both FIG. 7 and FIG. 8, determining the post system solids loading 801 in the control system 209 is facilitated by data from the solids analyzer 601. The control system 209 compares the desired solids loading 805 to the post system solids loading 801 and either adjusts directly or generates a signal to control the VFD 213 in order to adjust the rate of flow 807. If the post system solids loading 801 of the sewer main 805 is too low, then the VFD 213 speed is increased in order to increase the rate of flow to generate more separated liquid 113 and divert more wastewater from the sewer main 105. If the post system solids loading 801 of the sewer main 205 is too high, than then the VFD speed is decreased in order to decrease the rate of flow to generate less separated liquid 113 and divert less wastewater from the sewer main.

The target solids loading 805, in one embodiment is loaded into either program or data storage memory in the control system 209. Optionally, the target solids loading 805 level may be adjusted on-site at the wastewater concentrator or remotely. For example, it can be updated through wired or wireless means such USB, 802.11, Ethernet, 3G, 4G, or other standard communication protocol.

As with the algorithm of FIG. 4, the algorithm of FIG. 8 can be stored in the form of program instructions, for example, in a memory device connected to or internal to a microcontroller or microprocessor, a programmable logic device, a remote personal computer (PC) controlling the control system 209, and executed by any combination of these devices.

Figure 9:
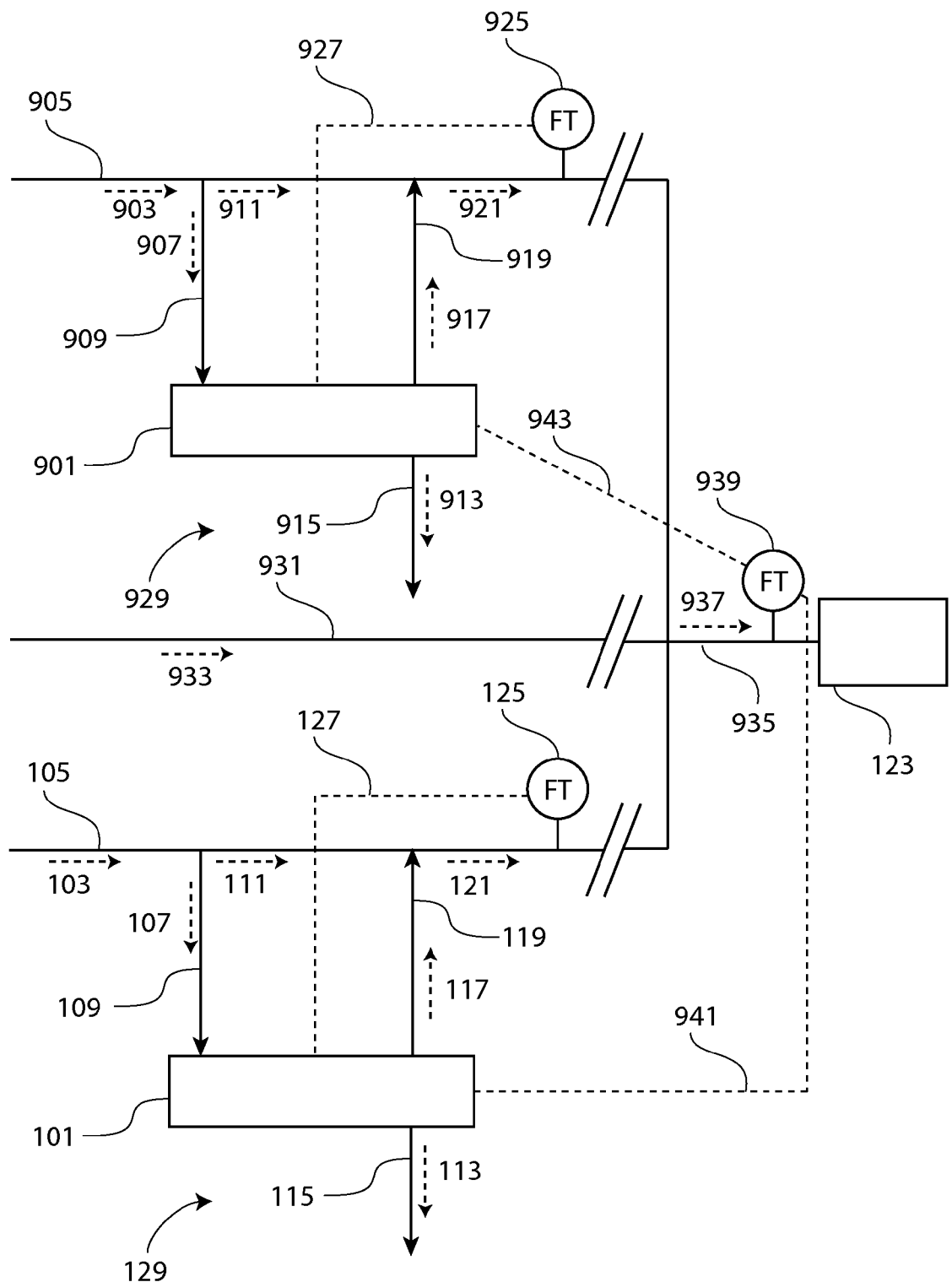
FIG. 9 shows an alternate embodiment of FIG. 1 showing a plurality of wastewater concentrators.

FIG. 9 is a high-level system diagram showing a wastewater piping system with several laterals or secondary sewer mains. In addition to wastewater concentrator system 101 shown in FIG. 1, FIG. 9 shows a second wastewater concentrator 901. Wastewater 903 flows through the secondary sewer main 905. A diverted wastewater portion 907 flows through inlet pipe 909. The non-diverted wastewater 911 remains in the sewer main 905. In accordance with principles of the invention that have been described in this disclosure, the wastewater is separated into separated liquid 913 through an outlet pipe 915 and concentrated solids 917 through a second outlet pipe 919 connected to the sewer main 905. The separated liquid 913 can be diverted for local reuse or disposal. In one embodiment, the separated liquid 913 is mostly water but main contain BOD or dissolved solids. This can be pumped deep into the ground in order to facilitate natural filtration. In another embodiment, the separated liquid 913 is further purified and sterilized and can be used for agricultural or commercial irrigation or for drinking water.

The concentrated solids 917 in the second outlet pipe 919 are reintroduced in the sewer main 905. The concentrated solids 917 are combined with the non-diverted wastewater 911 to form concentrated wastewater 921 in the sewer main. The resulting concentrated wastewater 921 has increased suspended solids. A portion of wastewater has been removed from the secondary sewer main 905 that is approximately equal to the separated liquid 913 diverted through the outlet pipe 915. This has the effect of increasing the system capacity of the sewer main 905 by an amount equal to the separated liquid 913. By increasing the system capacity of the sewer main 905 in this way, the wastewater loading of the sewer main 905 has been effectively been decreased.

In accordance with principals of the invention, the wastewater loading of secondary sewer main 905 is adjusted to a pre-determined level or pre-determined amount. This pre-determined amount may be set in accordance with a number of factors. For example, the pre-determined level may be set in order to make sure that the sewer main 905 is not over loaded during peak capacity. Similarly, the pre-determined level may be set in order to assure that the total wastewater 923 supplied to the wastewater treatment plant 123 supplied is not over loaded during peak demand.

In an embodiment, a flow transmitter 925 determines the rate of flow of the concentrated wastewater 921 in the secondary sewer main 905. The flow transmitter 925 communicates with the second wastewater concentrator 901 through a signal path 927. This information transmitted through the signal path can take many alternative forms, for example, analog voltage, or a digital signal. This may be either through wire or by wireless means.

As previously described, it may be desirable to adjust the flow in each wastewater lateral in accordance with a combination of the desired wastewater loading on the lateral itself and the overall wastewater loading on the entire wastewater system. In FIG. 9 there are three laterals: the sewer main 105, a first secondary sewer main 905, and a second secondary sewer main 931. The total wastewater supplied 923 supplied through sewer main portion 935 at the inlet of the wastewater treatment plant 123 is a combination of concentrated wastewater 121 from sewer main 105, concentrated wastewater 921 from the first secondary sewer main 905 and wastewater 933 from the second secondary sewer main 931. A flow transmitter 939 located long the sewer main portion 935 at the inlet of the wastewater treatment plant 123 measures the flow of the total wastewater supplied 923. The flow transmitter 939 sends flow data to the second wastewater concentrator 901 through a signal path 943 and to the wastewater concentrator 101 through another signal path 941. These signal paths may be analog, digital, wired or wireless. Both signal paths may be combined into a single multiplexed signal path and received by each wastewater concentrator using a unique identifier.

Figure 10:
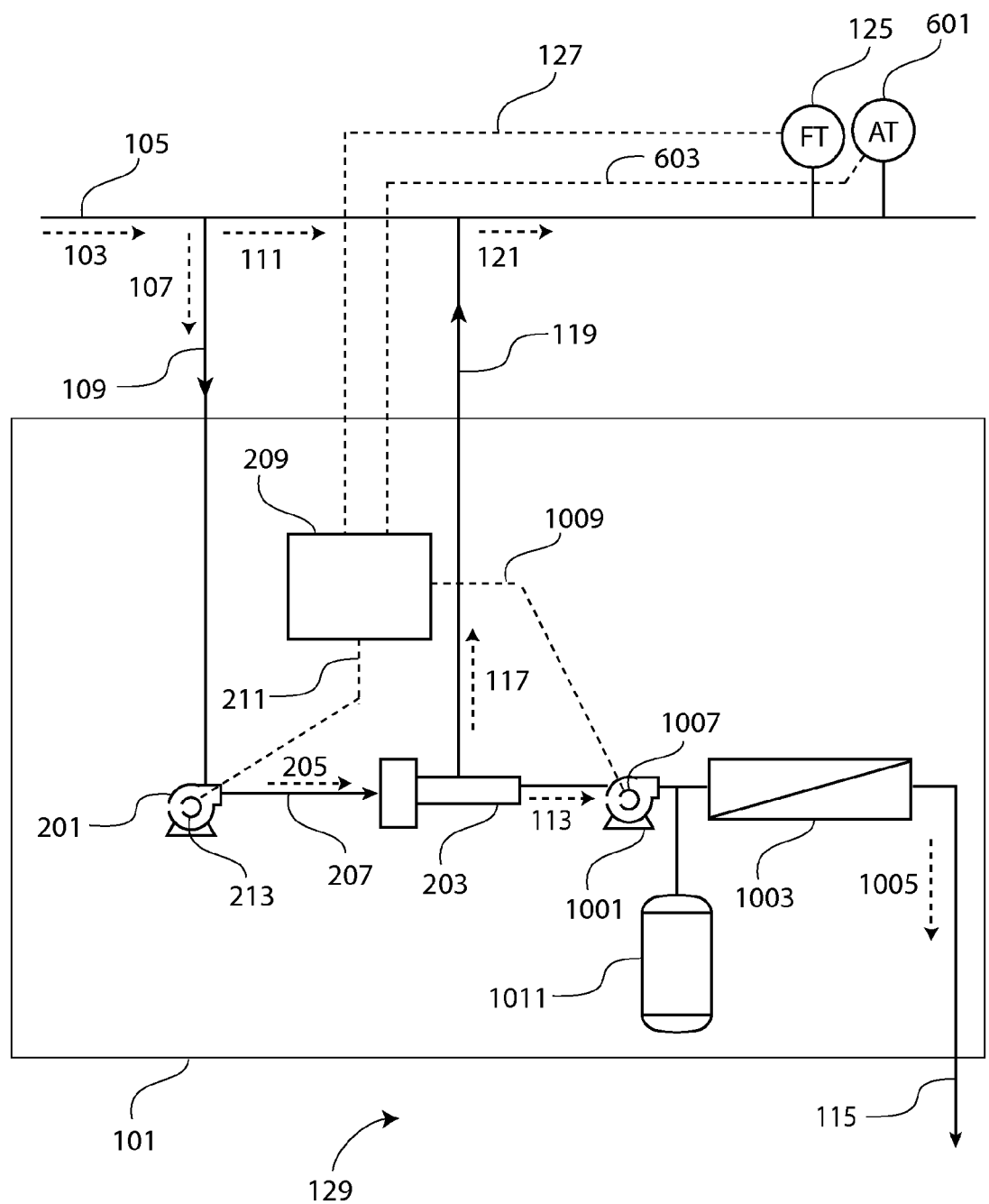
FIG. 10 shows an alternative embodiment of FIG. 2 showing means for purifying the separated liquid and a combination of controlling both solids loading and wastewater loading.

FIG. 10 shows a wastewater concentrator system with additional filtration and capable of controlling both wastewater loading and solids loading. The separated liquid 113 from the vortex separator 203 enters a feed pump 1001. The feed pump 1001 pumps the separated liquid 113 into a membrane filtration unit 1003. The membrane filtration unit 1003 removes most of the remaining particulates producing purified water 1005 that is discharged through outlet pipe 115. A VFD 1007 controls the speed of the feed pump 1001 used to pump the separated liquid 113 into the membrane filtration unit 1003. The control system 209 regulates the VFD 1007 through a signal path 1009. The signal path 1009 may be analog, digital, wired or wireless. In an alternative embodiment, a control valve can be used instead the VFD 1007 to control the flow of the separated liquid 113 into the membrane filtration unit 1003. In this alternative embodiment, the control system would regulate the position of control valve and the feed pump 1001 would a constant speed.

The membrane filtration unit 1003 can use nano-filtration, ultra-filtration, micro-filtration, reverse osmosis, or other equivalent membrane filtration technique for separating particles from water for the purpose of purifying the water. In an alternate embodiment, the purified liquid may be further purified and sterilized for local reuse, for example, for irrigation, potable water, or industrial use. In another embodiment, the purified liquid can be disposed of in nearby body of water, such as rivers, lakes, streams, or the ocean. Alternatively, the purified liquid can be disposed of by pumping it into the ground and allowing for further natural filtration. Depending on local environmental requirements and/or governmental regulations, the purified liquid may be further purified or sterilized before disposal or reuse.

Membrane filtration units generally have an optimum operational rate of flow. In order to main a constant rate of flow through the membrane filtration unit 1003, a storage tank 1011 can be employed to divert excess of the separated liquid 113 from the membrane filtration unit 1003 during periods of higher demand and reintroduce the separated liquid 113 to the membrane filtration unit 1003 during periods of lower demand.

The feed pump 1001 may be eliminated in a gravity feed system where there is sufficient pressure from the separated liquid 113 on the membrane filtration unit 1003 to allow the membrane filtration unit 1003 to operate.

In an alternative embodiment, a media or multi-media filter can be substituted for the membrane filtration unit 1003. Media filtration devices can include, for example, sand, anthracite, manganese green sand, clinoptilolite (zeolite), or activated carbon filtration units. Multi-media filtration units can include multiple layers of filtration media, for example, in one embodiment, a multi-media filter includes a combination of layered sand, anthracite, and garnet. Using a media or multi-media filter in place of the membrane filtration unit 1003, the storage tank can be eliminated if desired.

In another alternative embodiment, the membrane filtration unit 1003 and storage tank 1011 can be replaced by an aeration pond. The aeration pond can be used to oxidize aerobic bacteria and reduce the BOD and chemical oxygen demand of the separated liquid 113. The resultant liquid then further purified by filtration. Depending on local regulatory or environment conditions, the aeration pond can be followed by chemical, mechanical, thermal, or electrical filtration methods before disposal or reuse.

Figure 11:
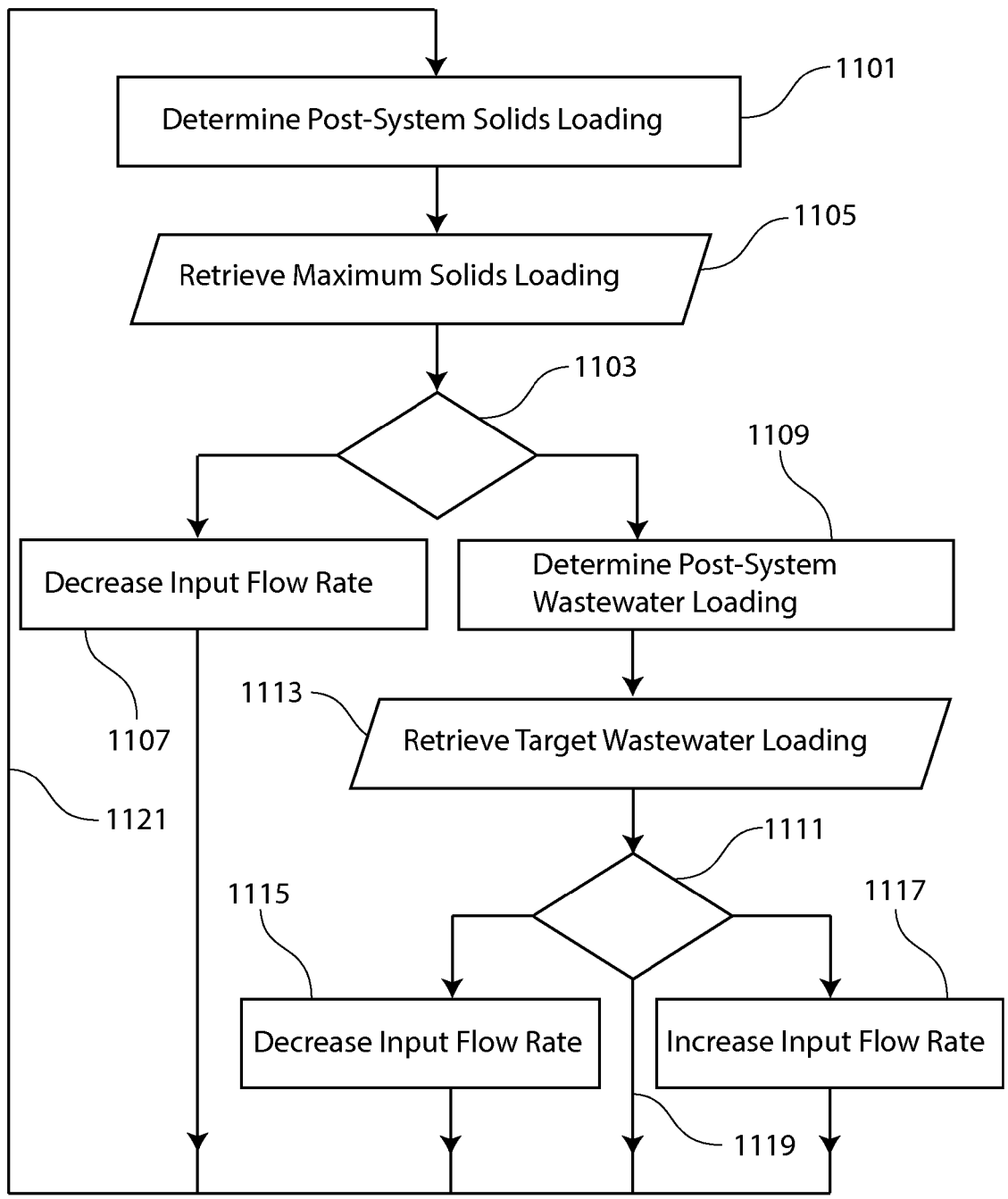
FIG. 11 shows a flow chart, in accordance with principles of the invention, for the controlling both solids loading and wastewater loading.

The control system of FIG. 10 can use both the solids loading of the concentrated wastewater 121 as measured by the solids analyzer 601 and the flow of the concentrated wastewater 121 as measured by the flow transmitter 125 to adjust the amount of diverted raw wastewater 107 removed from the sewer main 105 and the amount of concentrated solids stream 117 reintroduced into the sewer main 105. FIG. 11 is a flow chart for the wastewater concentrator of FIG. 10 showing an example of a method for accomplishing this.

Referring to FIG. 10 and FIG. 11, the solids analyzer 601 in combination with the control system 209 determines post-system solids loading 1101. The determined post-systems solids loading 1101 is compared 1103 to target maximum solids loading 1105. If the post-system solids loading 1101 is greater than or equal to the target maximum solids loading 1105 than the control system 209 decreases the input rate of flow 1107 by sending a signal to the VFD 213 to slow down the feed pump 201. If the post-system solids loading 1101 is less than the target maximum solids loading 1105 than control system in combination with the flow transmitter 125 determines the post-system wastewater loading and compares 1111 it to the retrieved target wastewater loading 1113. If the post-system wastewater loading is less than the retrieved target wastewater loading than the control system 209 decreases input rate of flow 1115 of the feed pump 201 in order to decrease the flow of diverted raw wastewater 107 out of the sewer main 105. If the determined post-system wastewater loading 1109 is greater than the retrieved target wastewater loading 1113, than the control system 209 increases rate of flow 1117 of the feed pump 201 in order to increase the flow of diverted raw wastewater 107. If the determined post-system wastewater loading 1109 is equal to the retrieved target wastewater loading 1113, the rate of flow is not adjusted 1119. The algorithm then loops back 1121 to the beginning and starts again.

Both the target maximum solids loading 1105 and target wastewater loading 1113 can be ranges of values rather then single values to enhance stability of the feedback control system. In one embodiment, if the post-system solids loading 1101 is greater than the target maximum solids loading range than the control system 209 decreases the input rate of flow 1107. If the post-system solids loading 1101 is less than the target maximum solids loading range, than the determined post-system wastewater loading 1109 is compared with the target wastewater loading range. If the determined post-system wastewater loading 1109 is within the target wastewater loading range, the flow is not adjusted. If the determined post-system wastewater loading 1109 is less than the target wastewater loading range, than the control system 209 decreases input rate of flow 1115. If the determined post-system wastewater loading 1109 is greater than the target wastewater loading range, the control system 209 increases input rate of flow 1117 so that more diverted raw wastewater 107 is removed from the sewer main 105 in order to decrease the wastewater loading.

Combining a multi-wastewater concentrator of FIG. 9 with the wastewater concentrator disclosed in FIG. 10 and FIG. 11 that responds to both solids loading and wastewater loading, it is possible to create a wastewater system that can respond to changing conditions in each part of the system and target wastewater loading and total maximum solids loading accordingly.

Figure 12:
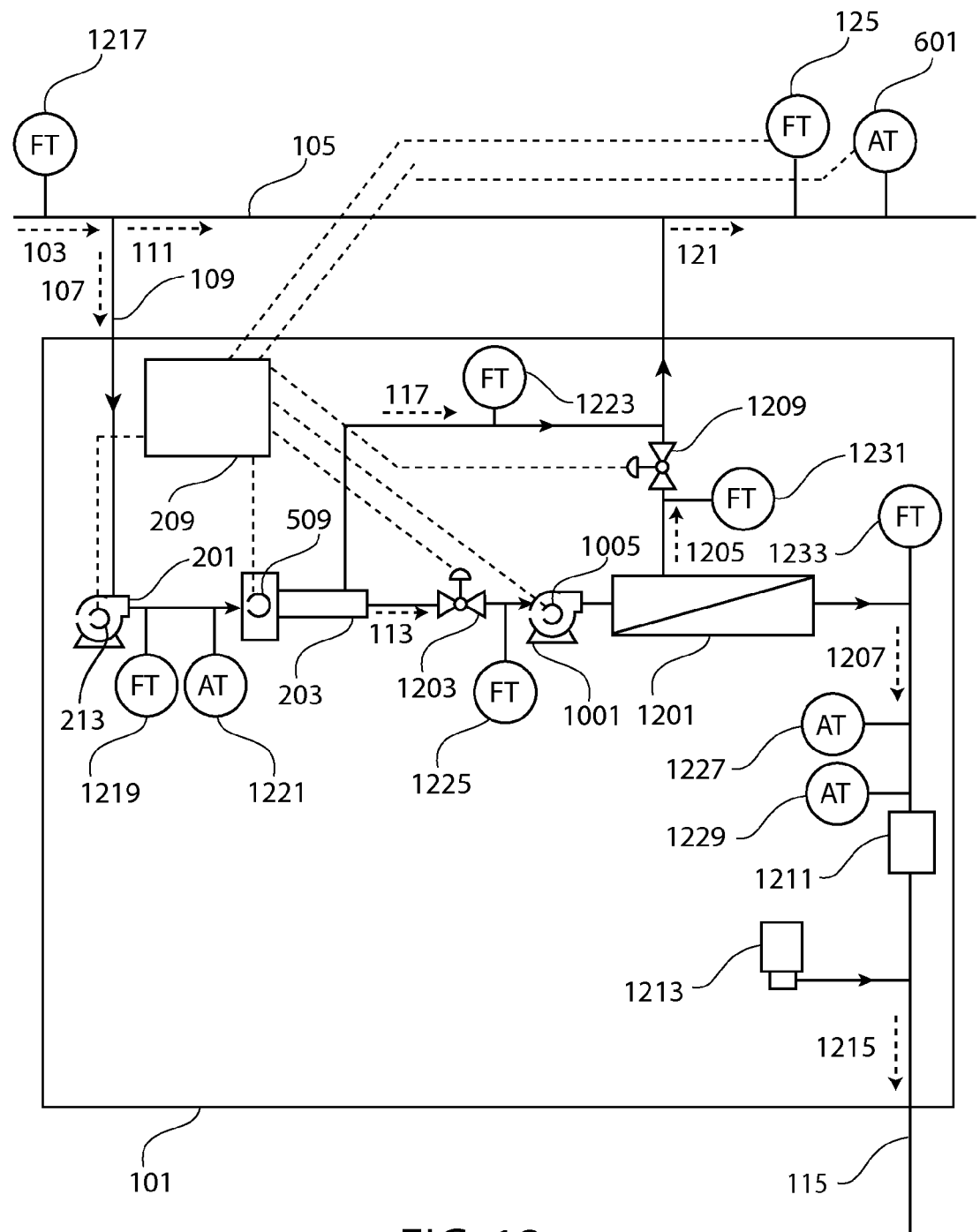
FIG. 12 shows an alternative embodiment of FIG. 2 showing alternative means for purifying separated liquid.

FIG. 12 shows an embodiment with an alternative control and additional purification of the separated liquid. Referring to FIG. 12, the separated liquid 113 flows from the vortex separator 203 to the feed pump 1001. The feed pump 1001 supplies enough net positive suction pressure to supply the separated liquid 113 to a nano-filtration membrane unit, also known as a membrane filtration membrane polisher or NFMP 1201. Restricting and modulating the flow of the two streams can be used to determine the fractionation ratio and rate of flow. The concentrated solids stream flow can be regulated by the speed of the VFD 509 in combination with a first flow valve 1203. The first flow valve 1203 can be controlled by the control system 209.

The NFMP 1201 further fractionates the separated liquid 113 into two streams: a concentrate stream 1205 and a product stream 1207. The concentrate stream 1205 is the water containing all residual suspended solids having a specific gravity to close to water to be efficiently removed by the voraxial separator plus a percentage of the dissolved solids. This is typically 10% to 15% of the total product fraction output of the NFMP. This portion may deviate significantly above or below this range depending on the efficiency of the vortex separator 203 at removing the suspended solids from the stream before it reaches the NFMP 1201 and also depending on the design of the NFMP 1201 itself. The concentrate stream 1205 resulting from the NFMP 1201 is combined with the concentrated solids stream 117. Both streams are returned to sewer main 105. The concentrated wastewater 121 in this embodiment is a combination of the non-diverted wastewater 111+the concentrated solids stream 117+the concentrate stream 1205. A control valve 1209 creates backpressure on the concentrate stream 1205 leaving the NFMP 1201 and can be used to control the portion of concentrate stream leaving the NFMP 1201.

The product stream 1207 is mostly water that is essentially free of suspended solids and typically has a BOD <5 mg/liter. This portion is typically 85-90% of the total output of the NFMP 1201. The percentage of product water to concentrate is referenced as the "recovery" of the NFMP 1201. Additional steps of media filtration followed by a distillation/evaporator column can be added to further remove traces of suspended, colloidal matter, and volatile organics not removed by the vortex separator 203.

The product stream 1207 passes through an ultraviolet light unit 1211 that destroys residual bacteria. A chlorine dispensing unit 1213 adds chlorine to the resulting purified water 1215 as a bacteria static agent (disinfection) to prevent the growth of bacteria during storage prior to use. Typically, enough chlorine is added to give a residual concentration of 1 to 1.5 mg/liter of free chlorine in the resulting purified water 1215. Introduction of amounts of chlorine to produce other ratios are also possible and depend on national, regional and local regulatory standards. The resulting purified water 1215, in one embodiment, may be used for local irrigation or may be further processed for use as potable drinking water. In another embodiment, the purified water 1215 can be used for cooling tower makeup water or other industrial uses. Alternatively, the purified water 1215, or a portion of the purified water 1215, can be diverted for disposal. This can be disposed of, for example, by pumping the purified water 1215 into the ground. Other examples of disposal include disposal into a nearby body of water, for example, an ocean, lake, river, stream, canal, or a constructed wetland.

The wastewater is diverted from the sewer main 105 at a deliberate rate and the concentrated solids stream 117 resulting and the concentrate stream 1205 are reintroduced into the sewer main 105 in a deliberate amount in order to control the wastewater loading and concentrated solids of the wastewater system. This can be controlled by control system 209 dynamically as previously described.

While the control of wastewater loading and solids loading in the sewer main 105 can be accomplished with a minimal number of sensors and feed pumps as previously described, a system with more measurement and control capability may be desirable. Again referring to FIG. 12, additional flow transmitters and solids analyzers are employed. It should be understood by the reader that the flow transmitters and solids analyzers in FIG. 12 are capable of communicating with the control system 209. This communication may be analog, digital, wired or wireless. It may be multiplexed on a single transmission channel.

A pre-system located flow sensor 1217 installed in sewer main 105 can be used by the control system to determine wastewater loading conditions before the wastewater concentrator system 101. The quantity of raw wastewater diverted to the wastewater concentrator system 101 is sensed by inlet flow sensor 1219. A suspended solids transmitter 1221 measures the percent of suspended solids present. As previously described, the quantity of wastewater diverted is determined by the speed of feed pump 201. In an embodiment, the speed of the feed pump 201 is adjusted by controlling the VFD 213 of the feed pump 201 through an adjustable set-point process control loop. The separation the diverted raw wastewater 107 in concentrated solids stream 117 and separated liquid 113 is controlled in FIG. 12 by the first flow valve 1203 and speed adjustment of the VFD 509. A flow transmitter 1223 measures the flow of the concentrated solids stream 117. The flow transmitter 1225 of the separated liquid flow measures the flow of the separated liquid 113 into the feed pump 1001 supplying the NFMP 1201. An analyzer transmitter 1227 measures the product stream 1207 conductivity. A pH analyzer transmitter 1229 measures the pH of the product stream 1207.

Figure 13:
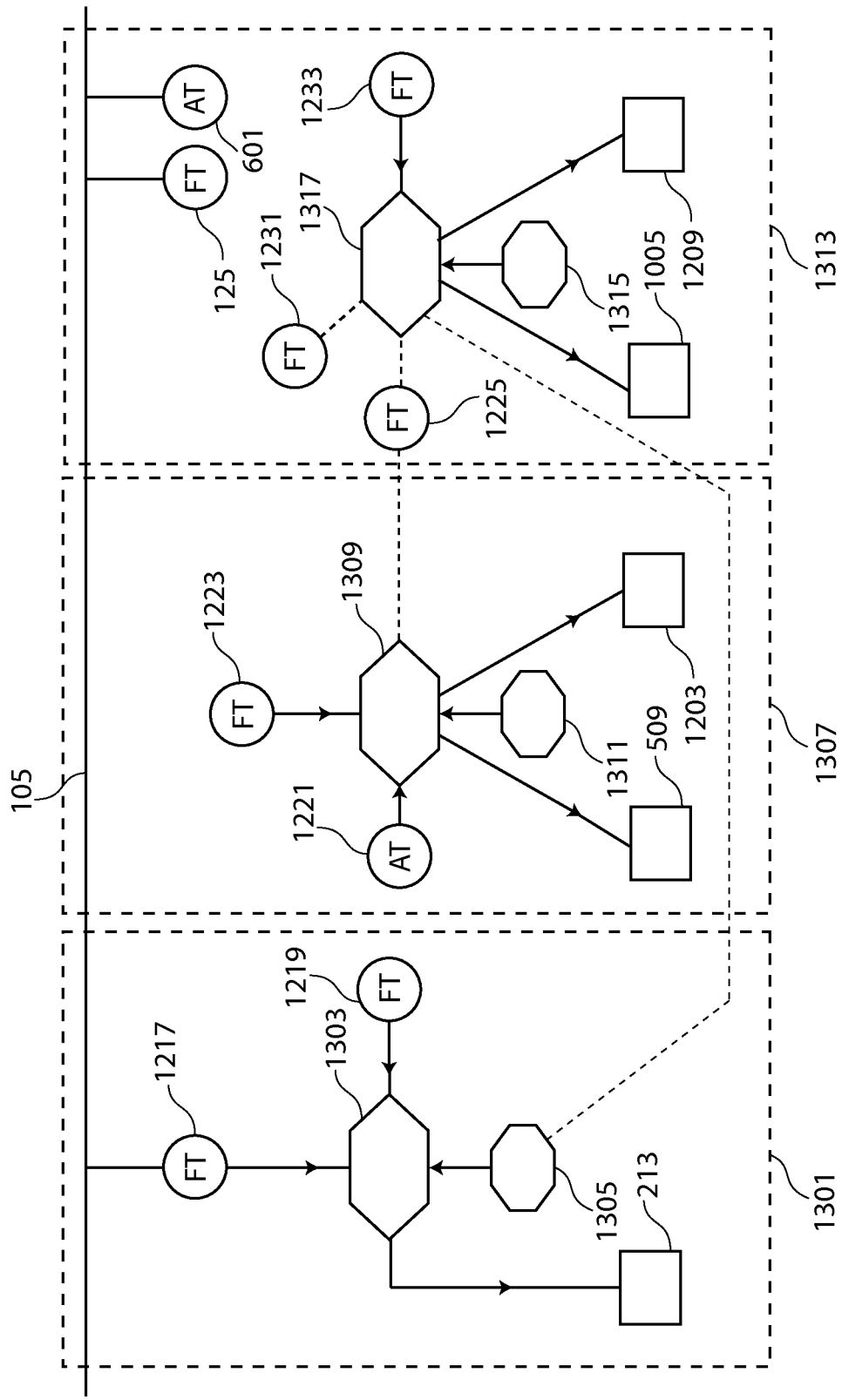
FIG. 13 shows a control system diagram for the embodiment of FIG. 12.

FIG. 13 is a diagram outlining the use of three control loops for controlling the flow of the wastewater separator. This should not be taken as the only approach to maintaining control of the system. The final product control loop 1313 controls the final product output, which in the embodiment of FIG. 12, is the resulting purified water 1215. In the final product control loop 1313, three flow transmitters control the set point 1315 for the flow/ratio controller 1317: flow transmitter 1225 of the separated liquid, concentrate stream flow transmitter 1231, and product stream flow transmitter 1233. A flow/ratio controller 1317 uses these three flow transmitters to maintain the product stream 1207 at a constant rate of flow and a constant ratio of product stream 1207 to concentrate stream 1205. This is desirable because membrane separators generally have an optimal operational rate of flow. The set point 1315 for the final product control loop 1313 is feedback through the control system to determine the set point of 1305 in first control loop 1301. In one embodiment, the output of the inlet flow sensor 1219 will display the actual flow being transferred from the sewer main 105 for wastewater concentrator throughput. Flow Controller 1303 adjusts the VFD 213 on the feed pump 201 to maintain correct flow to the system as required to maintain a constant flow of the product stream 1207. The middle control loop 1307 is designed to maintain the operation of the vortex separator 203. The flow transmitter 1225 of separated liquid in the final product control loop 1313 is used to determine the second control loop set point 1311. The speed of vortex separator 203 is adjusted to maintain a desired ratio of concentrated solids stream 117 as measured by the flow transmitter 1223 of the concentrated solids stream 117 and separated liquid 113 as measured by the flow transmitter 1225 of the separated liquid 113.

Within this disclosure flow transmitters have been used to measure flow and report the rate of flow and flow related information to the control system 209. Similarly, solids analyzers have been used to measure solids loading and report solids loading related information to the control system 209. The invention is by no means limited to these instruments for measuring flow and solids loading. Those skilled in the art will readily recognize equivalents. For example, there many means for measuring flow, flow transmitters or flow meters can include but are not limited to a magnetic flow meter, turbine flow meter, vortex flow meter, differential pressure meter, and paddle wheel flow meter. Suspended solids meters can include mass flow meters or infrared meters.

Both FIG. 1 and FIG. 9 show the separated liquid 113 flowing through the outlet pipe 115 of the wastewater concentrator 101. Similarly, FIG. 9 shows separated liquid 913 flowing through the outlet pipe 915 of the second wastewater concentrator 901. It should be understood by the reader that in alternative embodiments further purified water could flow through either the outlet pipe 115 of the wastewater concentrator 101 and/or the outlet pipe 915 of the second wastewater concentrator. For example, in FIG. 10, purified water 1005 flows through the outlet pipe 115. In FIG. 12, further purified water 1215 flows through the outlet pipe 115 of the wastewater concentrator 101.

While various methods for treating the separated liquid 113 have been demonstrated, it is not the inventor's intent to limit treatment of the separated liquid 113 to these methods and apparatus. It should be also understood, by those skilled in the art, that other treatment methods and apparatus can be applied either alone or in combination. Referring to FIG. 12, for example, a media filter, a multi-media filter, polymer coagulation unit, or a cartridge filtration unit (for example, pleated paper, porous ceramic, or filament wound cartridges) can be applied before the feed pump 1001 and NFMP 1201.

A wastewater concentrator has been described that can reduce the hydraulic loading in a wastewater piping system. The wastewater concentrator can also be applied to within a wastewater treatment plant in order to reduce the hydraulic loading of the biological separation processes. A wastewater concentrator as described thus far in this disclosure can be inserted within the wastewater treatment plant in the flow path between the wastewater treatment plant inlet and the first biological treatment stage.

Figure 14:
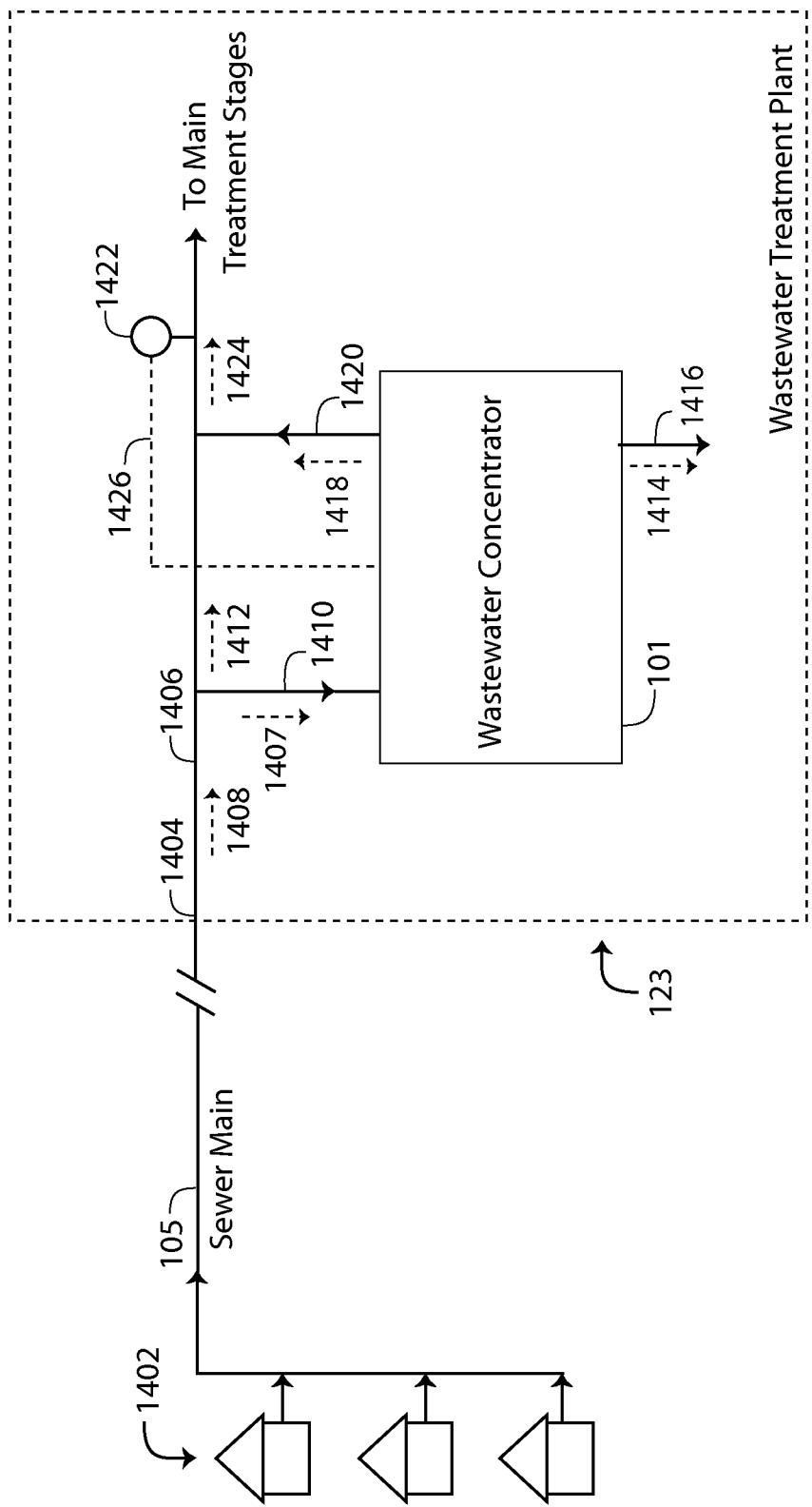
FIG. 14 shows a high-level system diagram of a wastewater concentrator system with a wastewater treatment plant.

FIG. 14 is a simplified conceptual overview of the wastewater concentrator system 101 in the context of functioning within the wastewater treatment plant 123. Referring to FIG. 14, a neighborhood 1402 disposes of their sanitary waste into the sewer main 105 or into a sewer line leading to the sewer main 105. The sanitary waste typically is piped into the sewer system from toilets, sinks, baths, or showers. The neighborhood 1402 can include residential neighborhoods and/or commercial businesses. The sewer main 105 connects to the inlet 1404 of the wastewater treatment plant 123. In FIG. 14, the wastewater concentrator system 101 is connected along the flow path 1406 between the inlet 1404 of the wastewater treatment plant 123 and primary treatment stages.

A portion of the raw wastewater 1408 flowing through the inlet 1404 is diverted, shown as diverted wastewater 1407, from the flow path 1406 through an inlet pipe or diversion pipe 1410 into the wastewater concentrator system 101. The non-diverted wastewater 1412 remains in the flow path 1406. In accordance with principles of the invention that have been previous described, the wastewater is separated into separated liquid 1414 through a first outlet pipe 1416 and solids 1418, or separated or concentrated solids, through a second outlet pipe 1420. A substantial portion of the liquid has been removed from the solids 1418. The separated liquid 1414 can be diverted for local reuse or disposed of, as previously described. In one embodiment, the separated liquid 1414 can be mostly water but may contain BOD or dissolved solids. In this case, the liquid can be pumped deep into the ground in order to facilitate natural filtration, for example, media filtration from natural or artificially placed sand. In accordance with local environmental or governmental regulations, the separated liquid 1414 can be further purified before pumping into the ground. In another embodiment, the separated liquid 1414 is further purified and sterilized and can be used for agricultural or commercial irrigation or for drinking water. In an alternative, embodiment, the separated liquid 1414 can be further purified and disposed of into a body of water. For the purpose of this disclosure, the term "body of water" can refer to natural or man-made bodies of water, for example, oceans, seas, lakes, basins, or ponds as well as natural or man-made waterways, for example, rivers, streams, or canals. In another embodiment, the separated liquid 1414 can be further purified and used for cooling tower makeup water or for other industrial processes.

The separated liquid 1414 can be treated either for reuse or for disposal, for example, by electrical, chemical, thermal, or mechanical means alone or in combination. Electrical means can include, for example, UV light, electrically produced ozone, and electro-dialysis. Chemical means can include, for example, chlorination and other chemical disinfectants. Thermal means can include, for example, pasteurization, boiling, distillation, or solar heating. Mechanical means can include, for example, media or multi-media filtration, membrane filtration, cartridge filtration, and aeration. The above examples are meant to be exemplary and not limiting, other means of electrical, chemical, thermal, and mechanical means are possible.

The solids 1418 in the second outlet pipe 1420 are reintroduced in the flow path 1406. The solids 1418 are combined with the non-diverted wastewater 1404 to form concentrated wastewater 1424 in the flow path 1406. The resulting concentrated wastewater 1424 has increased suspended solids. A portion of wastewater has been removed from the flow path 1406 within the wastewater treatment plant 123 that is approximately equal to the separated liquid 1414 diverted through the first outlet pipe 1416. This has the effect of increasing the system capacity of the flow path 1406 by an amount equal to the separated liquid 1414. By increasing the system capacity of the flow path 1406 in this way, the wastewater loading of the flow path 1406 has been effectively been decreased.

In accordance with principals of the invention, the wastewater loading of flow path 1406 is adjusted to a pre-determined level or pre-determined amount. This pre-determined amount may be set in accordance with a number of factors. For example, the pre-determined level may be set in order to make sure that the primary treatment stages, which generally include biological treatment stages are not over loaded during peak capacity. In one embodiment, a flow transmitter 1422 determines the rate of flow of the concentrated wastewater 1424 in the flow path 1406 downstream from the diversion pipe 1410. The flow transmitter 1422 communicates with the wastewater concentrator system 101 through a first signal path 1426. This information transmitted through the signal path can take many alternative forms, for example, analog voltage, or a digital signal. This may be either through wire or by wireless means.

Figure 15:
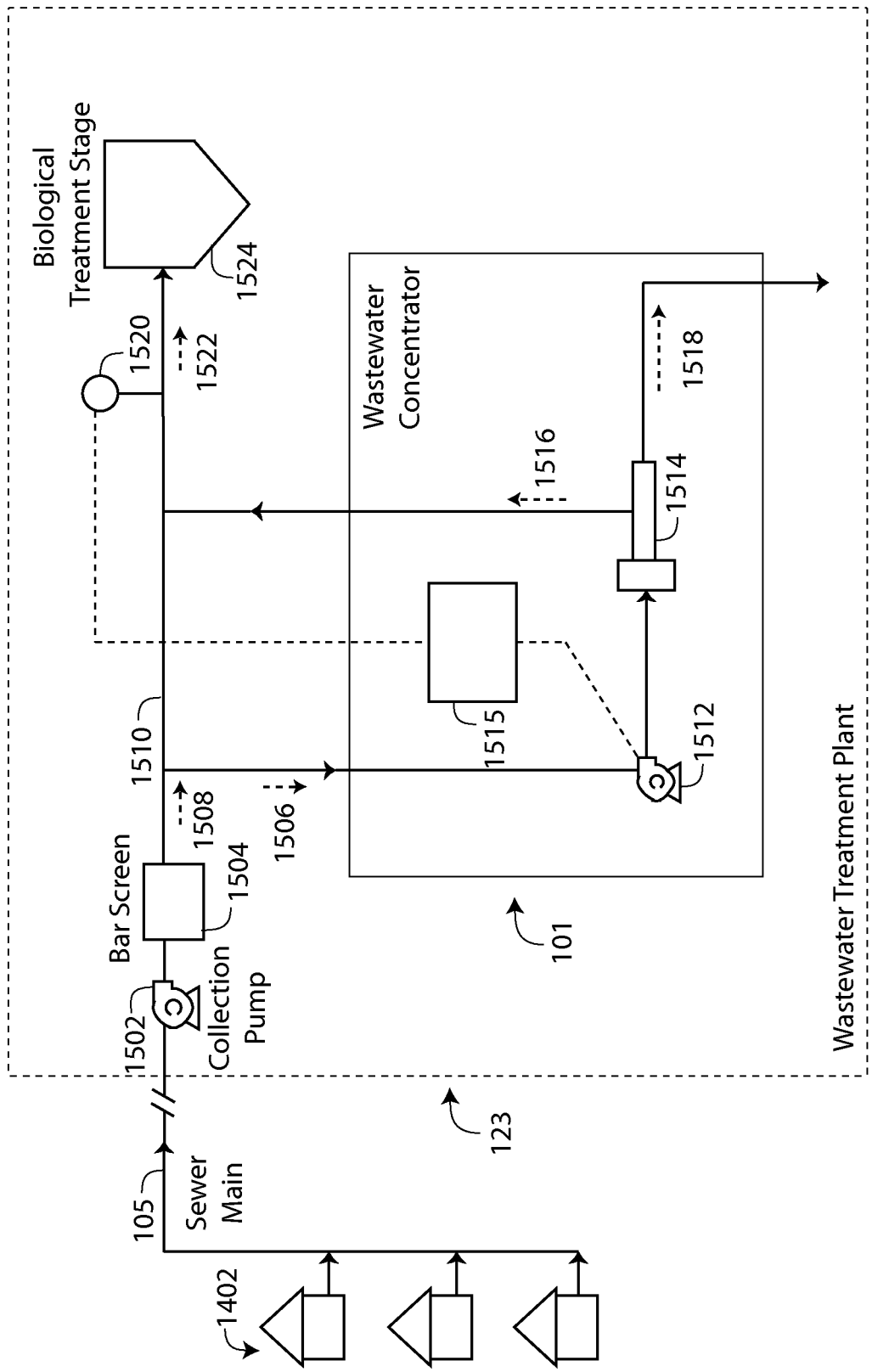
FIG. 15 shows a simplified view of a wastewater concentrator system used within a wastewater treatment plant.

FIG. 15 shows a partial block diagram of the wastewater treatment plant 123 showing, in one embodiment, the placement of the wastewater concentrator system 101. In FIG. 15, sanitary wastewater flows from neighborhood 1402 into a sewer main 105. The sewer main flows into the wastewater treatment plant 123. A collection pump 1502 pumps the wastewater from the sewer main 105 through the inlet of the wastewater treatment plant 123. The wastewater flows through a bar screen 1504 where debris such as rags, condoms, branches, and other large material is filtered. A portion 1506 of the resultant wastewater 1508 is diverted from the main flow path 1510. A feed pump 1512 pumps the portion 1506 to a centrifugal separator 1514. The centrifugal separator separates the portion 1506 into solids stream 1516 and liquid stream 1518. The solids stream is reintroduced back into the main flow path 1510 downstream for the point of diversion. The rate at which the portion 1506 is diverted from the main flow path 1510 and the rate at which solids stream 1516 is reintroduced is determined by speed of the feed pump 1512 and is controlled by a flow controller 1515 and by flow values. These details are discussed previously in this disclosure and apply equivalently to the wastewater concentrator depicted in FIG. 15. The flow controller 1515 determines how much wastewater should be diverted from the main flow path 1510 based on measurement of flow rate from a flow analyzer 1520 so that the hydraulic loading in the main flow path down stream from the point of diverting is either below a predetermined maximum quantity or within a preset range. In the illustrated embodiment, the predetermined maximum quantity can be the capacity of the biological separation stage. The concentrated wastewater 1522 resulting from engaging the wastewater concentrator, feeds the input of the biological treatment stage 1524. For the purpose of this disclosure, a flow controller can be an electronic, computer, or electromechanical controller for controlling the wastewater concentrator system 101. A flow controller for example, can control flow values, or include motor speed controls. The flow control may include inputs for measuring various parameters. These inputs may be analog or digital or a combination of analog and digital. The flow controller can include a microprocessor, microcontroller, FPGA, ASIC, or other embedded device. The flow controller may include a combination of software and peripherals for a personal computer or mobile device. The flow controller may be capable of transmitting and receiving information by wired or wireless signal pathways.

Figure 16:
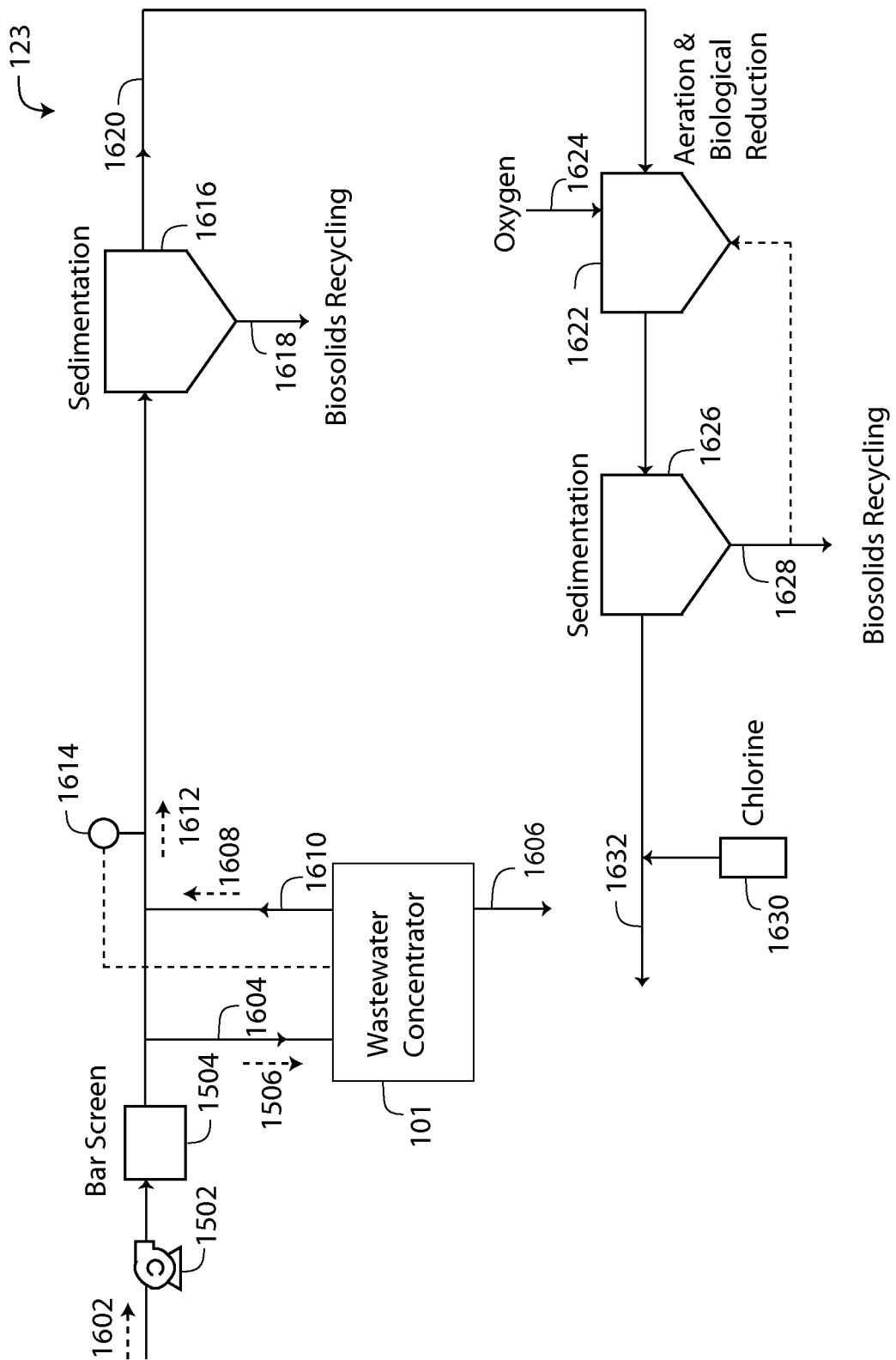
FIG. 16 shows a high-level system diagram of a wastewater treatment plant showing an illustrative placement of the wastewater concentrator.

FIG. 16 depicts a system diagram of a wastewater treatment plant 123 with the wastewater concentrator placed between the bar screen 1504 and sedimentation stage 1616. Wastewater 1602 enters the wastewater plant into a collection pump 1502. Alternatively the feed pump can be located outside of the wastewater treatment plant 123 or the wastewater can be gravity fed. The wastewater 1602 passes through a bar screen 1504, as previously described. The portion 1506 of diverted wastewater flows through a diversion path 1604. The diversion path 1604 can be a pipe, trough, channel or any suitable diversion structure. The portion 1506 of diverted wastewater enters the wastewater concentrator system 101. The wastewater concentrator separators the wastewater into a liquid stream 1606 and a solids stream 1608 as previously described. The solids stream is mixed with the wastewater from the bar screen 1504 to create concentrated wastewater 1612. The hydraulic loading and solids loading of the concentrated wastewater can be controlled dynamically by the wastewater concentrator and set to ether within a preset range or to below a maximum preset value. In this embodiment, his preset maximum value or preset range can be, for example, determined by either a maximum hydraulic loading or an optimal loading range for the sedimentation stage 1616. While the details are the operation of the wastewater concentrator are not shown in this diagram, it should be readily understood by the reader that wastewater concentrator can operate in a manner equivalent to those described in FIGS. 2, 4, 5, 7, 8-13.

The concentrated wastewater 1612 enters the sedimentation stage 1616. Within the sedimentation stage 1616, smaller suspended solids sink to the bottom and are sent to biosolids recycling. The resultant output stream 1620 is sent to the aeration and biological reduction stage 1622. Oxygen 1624 is injected into the process in order to help facilitate biological reduction by microorganisms. In the final sedimentation stage 1626, the microorganisms settle to the bottom of the tank and are removed 1628. The living microorganisms can optionally be recycled into the aeration and biological reduction stage 1622. After the final sedimentation stage 1626, the output stream is chemically disinfected with chlorine 1630. The resultant stream 1632 can be disposed of or further purified for reuse. Similarly the liquid stream 1606 from the wastewater concentrator can reused or disposed of, as previously described.

Figure 17:
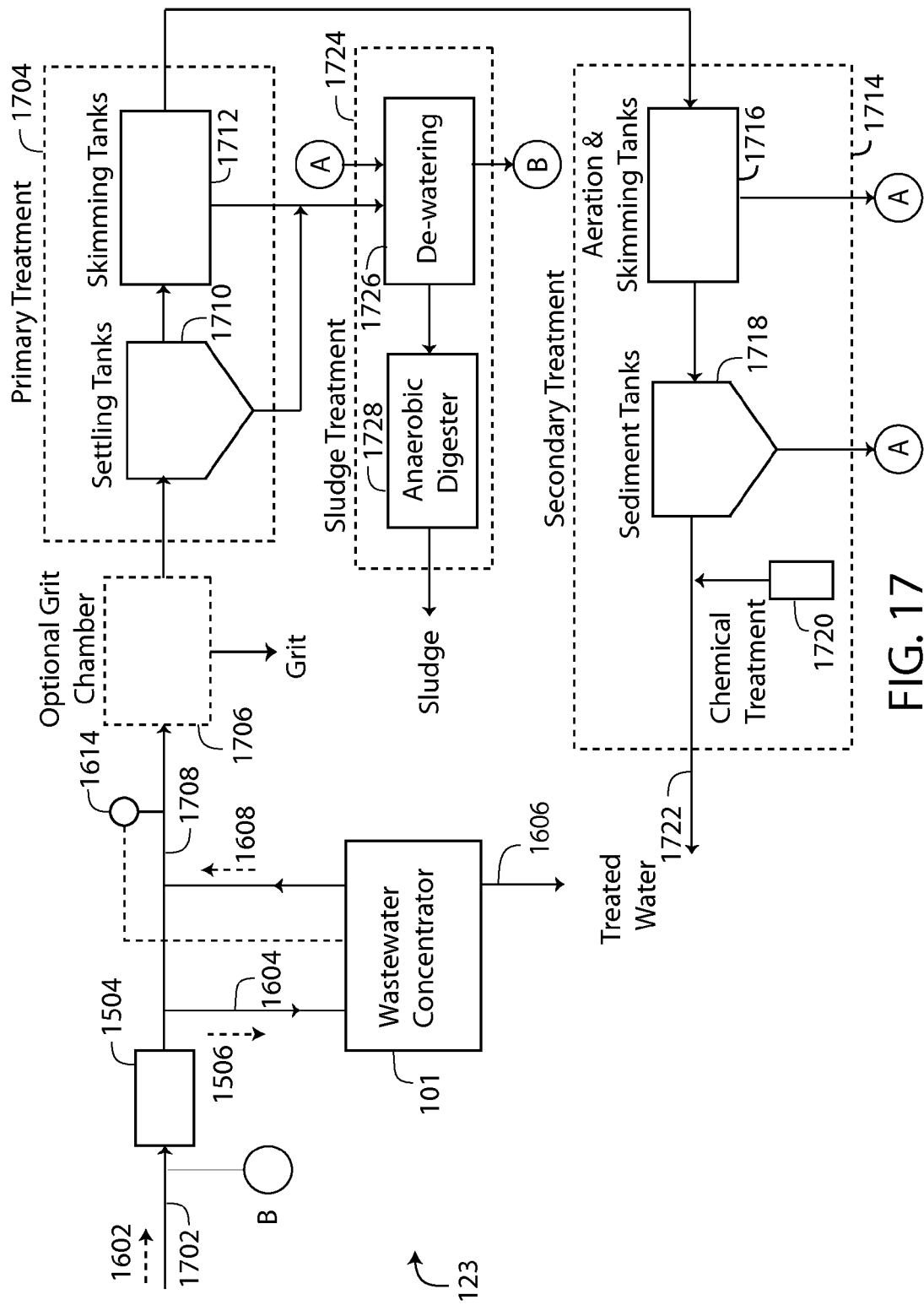
FIG. 17 shows an alternative high-level system diagram of a wastewater treatment plant showing an illustrative placement of the wastewater concentrator

FIG. 17 shows an alternate embodiment of a wastewater concentrator system 101 within a wastewater treatment plant 123. The wastewater concentrator is placed between the inlet of the wastewater treatment plant 1702 and the primary treatment stage 1704. Depicted is a bar screen 1504 that is optional and an optional grit chamber 1706. As previously described, the wastewater concentrator system 101 diverts a portion 1506 of the wastewater 1602 from the inlet stream through diversion path 1604. The wastewater concentrator receives feedback from a flow transmitter 1614 or equivalent device. The wastewater concentrator produces a solids stream 1608 that is introduced back into the main flow path 1708 leading to primary treatment stage 1704. The liquid stream can be disposed of or reused as previously described depending on the treatment details following the separation stage within the wastewater concentrator. While the details of the operation of the wastewater concentrator are not shown in this diagram, it should be readily understood by the reader that wastewater concentrator can operate in a manner equivalent to those described in FIGS. 2, 4, 5, 7, 8-13.

Since the structure of the wastewater treatment plant 123 is shown to illustrate the context in which the wastewater concentrator 101 is used, the elements will not be described in detail. The primary treatment stage 1704 includes a settling tank 1710 and a skimming tank 1712. The main output of the settling tank 1710 goes to the secondary treatment stage 1714. The secondary treatment stage includes aeration and skimming tanks 1716, followed by a sediment tank 1718, and chemical treatment 1720. The output of this process is treated water 1722 that can be disposed of or further purified for reuse. The settled matter from the primary treatment and secondary treatment stages, are processed in a sludge treatment stage 1724 with dewatering 1726 and anaerobic digestion 1728. The resultant output being sludge. The water from the dewatering 1726 can optionally be recycled and reintroduced near the plant inlet.

Figure 18:
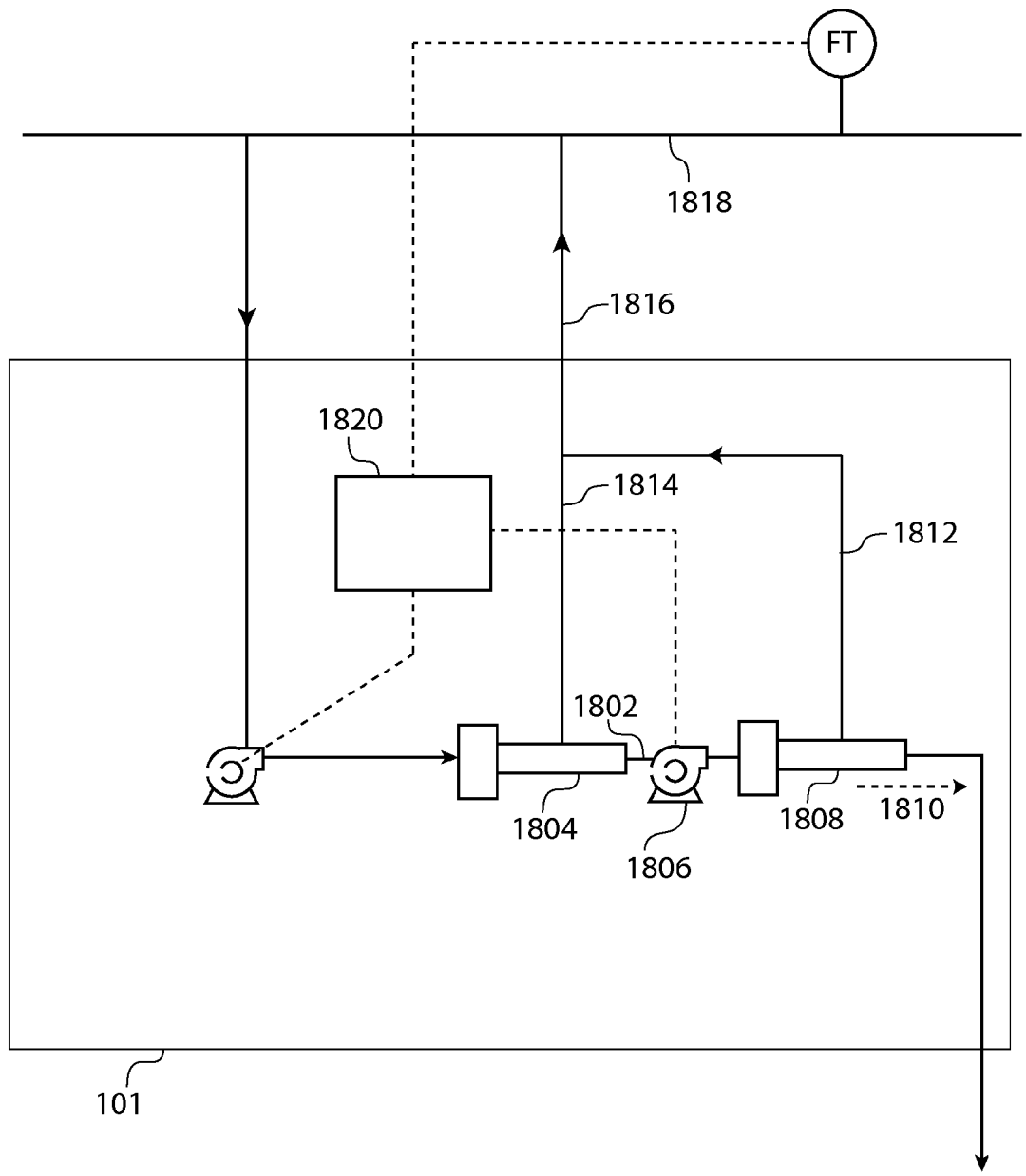
FIG. 18 shows an embodiment of a wastewater concentrator with two separators in series.

It may be desirable to further purify the separated liquid from the separation stage by adding a second separator in line with the first separator. FIG. 18 shows this arrangement for the wastewater concentrator system 101. The liquid stream 1802 of separator 1804 is connected to a feed pump 1806. The feed pump in turn is connected to second separator 1808. The resultant liquid output 1810 of the second separator 1808 can be further proposed, as previously described. The second separator solids output 1812 can be combined with the first separator solids output 1814. The resultant solids stream 1816 is reintroduced into the main flow 1818. Flow controller 1820 can control the flow of wastewater to both separators.

Throughout this disclosure, a method and apparatus has been described where the diverted wastewater flows through a separator capable of dynamically separating solids and liquid. One class of separator particularly suitable is a separator that utilizes the principles of centrifugal force. This class of separator is generally known as centrifugal separators. Centrifugal separators include vortex or cyclone separators, and centrifugal decanters. As previously described, principles of vortex separation were taught in FIG. 3. Several other examples of centrifugal separators are described in the following paragraphs and in FIGS. 19-21 and 26. These are meant to illustrative and aid in understanding. They are not meant to limit the invention to the examples given. Those skilled in the art, after reading this disclosure, will readily recognize other centrifugal separators that may be incorporated in accordance to principles of the invention.

Figure 19:
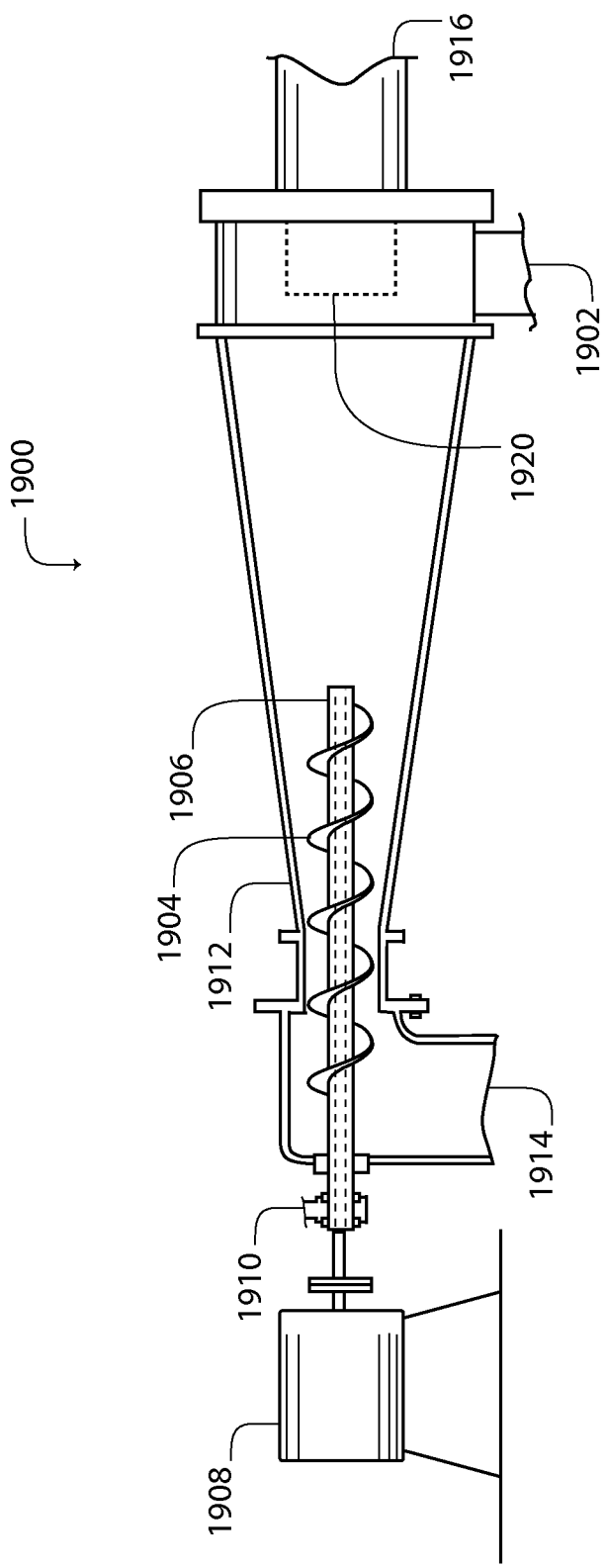
FIG. 19 shows a centrifugal separator in the form of a cyclone separator.

FIG. 19 shows an example of a centrifugal separator, in the form of a cyclone separator that may be adapted for separating wastewater into solids and liquid in accordance with principles of the invention. The separator is described in U.S. Pat. No. 4,303,546 by Moro et al. FIG. 19 is adapted from Moro in order to illustrate the principles taught by Moro. Referring to FIG. 19, the cyclone separator 1900 includes an inlet 1902. The inlet 1902 can be utilized to feed wastewater into the cyclone separator 1900 tangentially. A variable speed motor 1908 drives a screw impeller 1904 with a hollow shaft 1906. Air is feed through the hollow shaft through an air inlet 1910. The chamber 1912 is conically shaped in order to enhance separation. The heavier solids are discharged through a first discharge outlet 1914. The liquid is separated is ejected through a second discharge outlet 1916. An overflow finder 1918 is positioned at the apex terminus of the cone formed by the chamber 1912. It may be desirable to place a bar screen before the separator in order to filter out coarse refuse that might otherwise be forced out of the second discharge outlet 1916.

Figure 20:
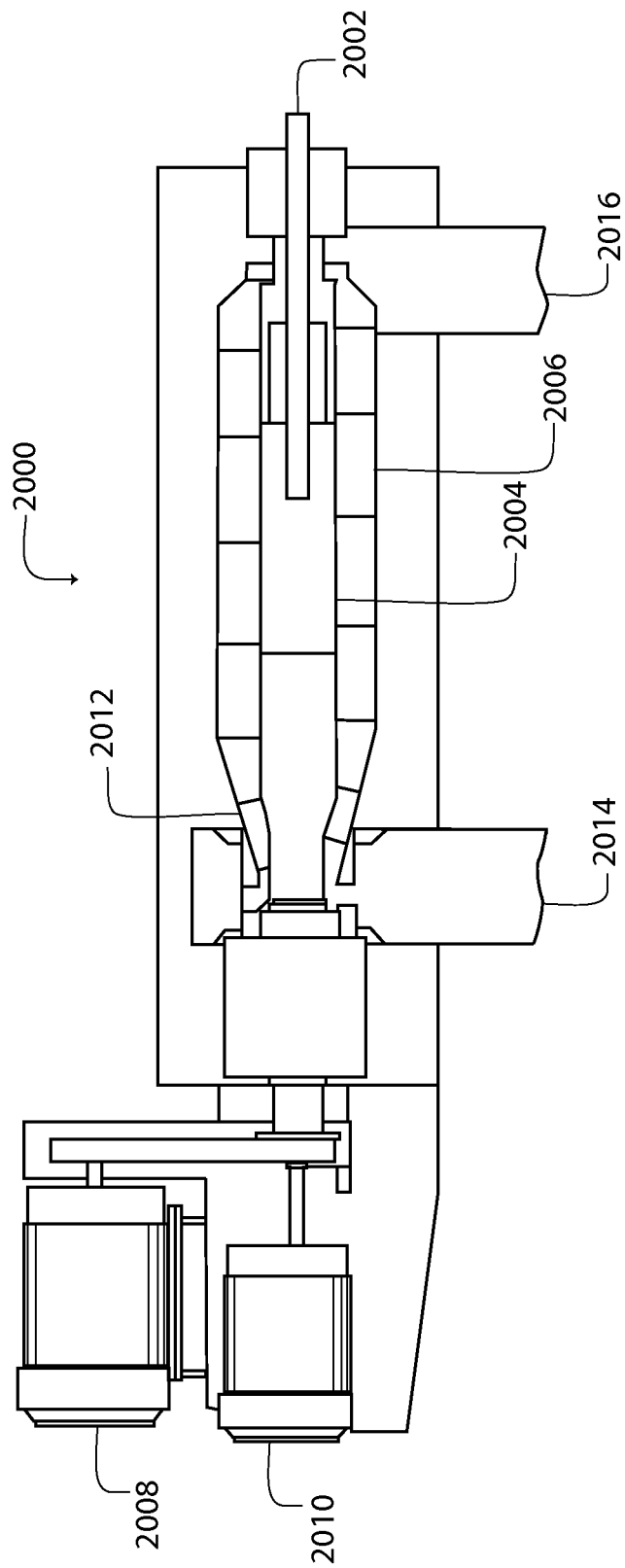
FIG. 20 shows an example of a centrifugal separator in the form of a centrifugal decanter.

FIG. 20 shows an embodiment of centrifugal separator in the form of centrifugal decanter. FIG. 20 is an approximate rendition of a centrifugal decanter made by GEA Westphalia. The diverted wastewater enters the separator 2000 through an inlet pipe 2002 of the separator 2000. The inlet pipe 2002 terminates in a distribution section 2004 that allows the wastewater to pass into a separation chamber 2006. A main motor 2008 and variable speed motor 2010 drive a bowl 2012. The bowl has a conical outer surface for dewatering solids and a cylindrical central portion for clarifying the liquid. Heavier solids are separated and driven by centrifugal force on the outside of the cone toward a solids discharge outlet 2014. The lighter liquid is separated and exits through a liquid discharge outlet 2016.

Figure 21:
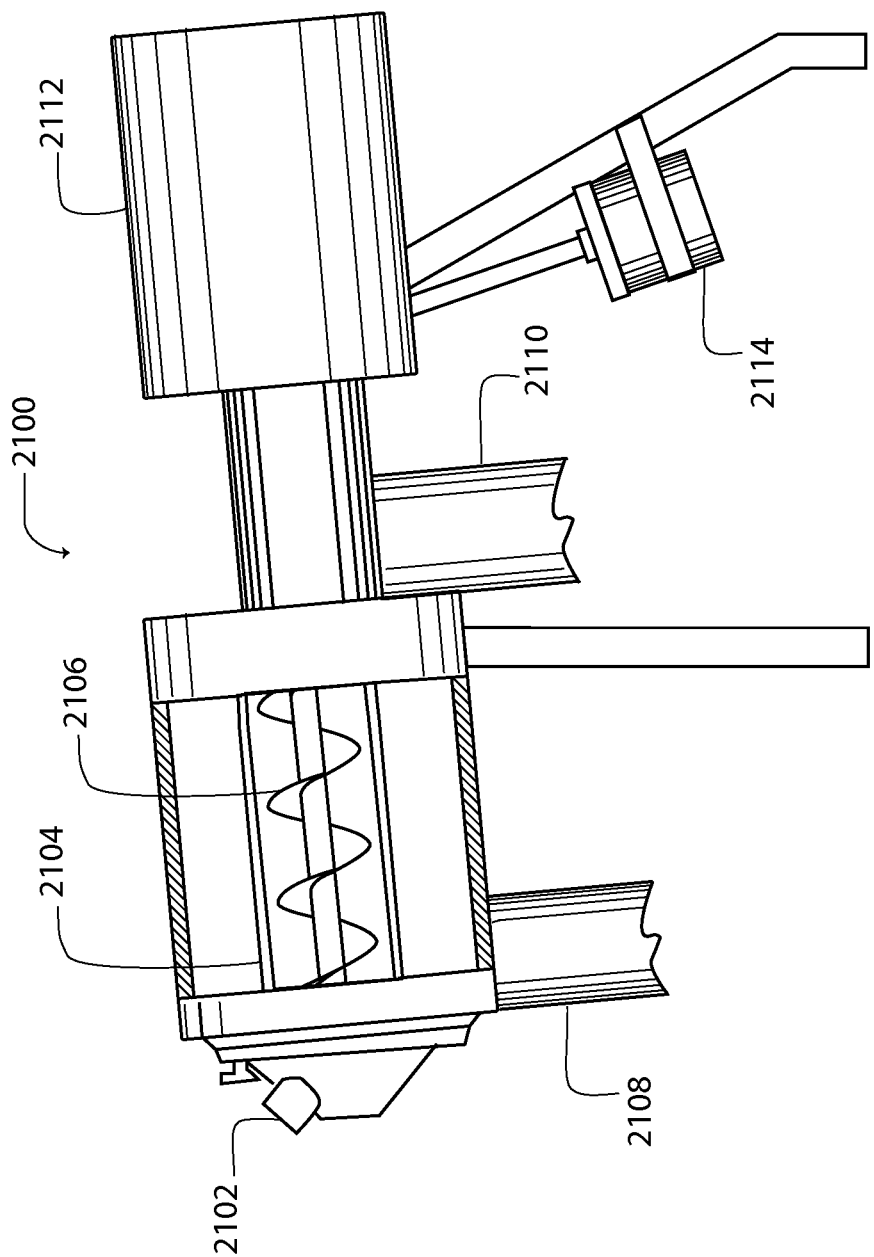
FIG. 21 shows an example of a liquid-solids centrifugal separator that includes control over the liquid-solids output ratio.

FIG. 21 shows a centrifugal solid-liquid separator where the angle of the device can used to adjust dryness of the solids. The separator 2100 depicted in FIG. 21 is a modified version of a solid-liquid separator from Russell Finex. The diverted wastewater enters the separator 2100 through a separator inlet 2102. The wastewater enters a cylindrical mesh basket 2104. A rotating paddle assembly 2106, in the shape of a helical scroll, pushes the liquid through the cylindrical mesh basket 2104 by centrifugal force out through the liquid discharge outlet 2108. The rotating paddle assembly 2106 pushes the retained solids within the mesh basket upward out of the basket into the solids discharge outlet 2110. The solids concentration through the solids discharge outlet 2110 can be controlled by adjusting the tilt angle of the unit and by varying the speed of the drive motor 2112. In this modified embodiment, auxiliary motor 2114 can be use to adjust the tilt angle.

Figure 22:
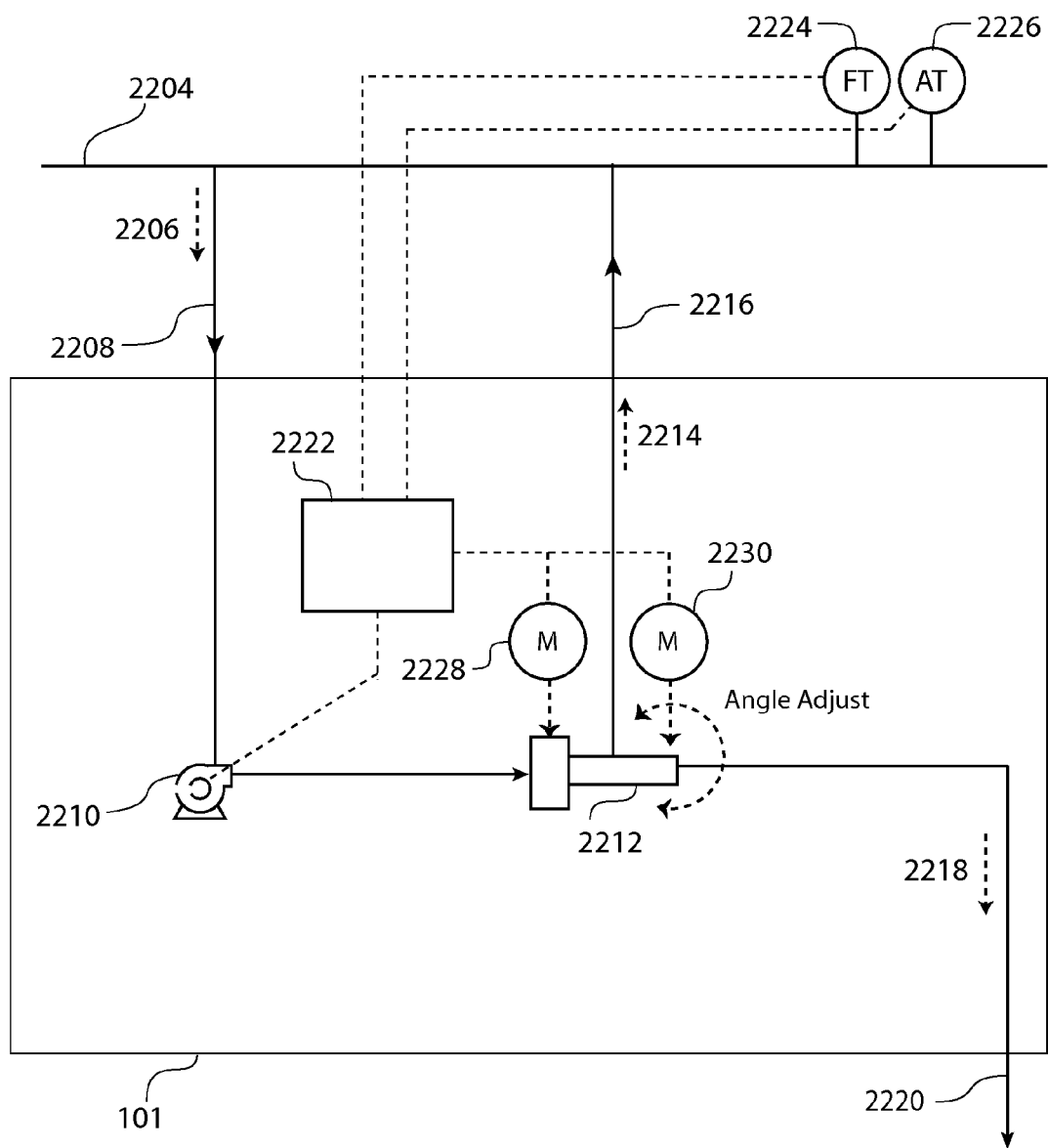
FIG. 22 shows a block diagram utilizes the centrifugal separator of FIG. 21.

FIG. 22 shows a block diagram of a wastewater concentrator system 101 utilizing a separator 2202 similar to the separator depicted in FIG. 21. Wastewater flows through the main flow path 2204. In applications, such as those depicted in FIG. 1, the main flow path 2204 can be the sewer main 105. For applications, such as those depicted in FIG. 14, the main flow path 2204, is between the wastewater plant inlet and the first biological treatment stage within a wastewater plant. A wastewater portion 2206 is diverted from the main flow path 2204 through piping 2208 to a feed pump 2210. The feed pump 2210 controls the amount of the wastewater portion 2206 that is feed to the wastewater separator 2212. The wastewater separator 2212 separates solids 2214 through path 2216 and liquid 2218 through path 2220. The liquid 2218 can be further purified as previously described in this disclosure. A flow controller 2222 calculates the hydraulic loading from the flow rate measured by a flow transmitter 2224 and solids density from a solids analyzer 2226. The flow controller 2222 can adjust the rate diversion of the wastewater portion 2206 in order to dynamically control the hydraulic loading within either a preset range or below a maximum preset quantity. The flow controller 2222 can control the motor speed of the separator motor 2228 or the adjustment angle of the wastewater separator 2212 through motor 2230 in order to dynamically adjust the solids concentration and control the solids loading below a preset quantity.

Figure 23:
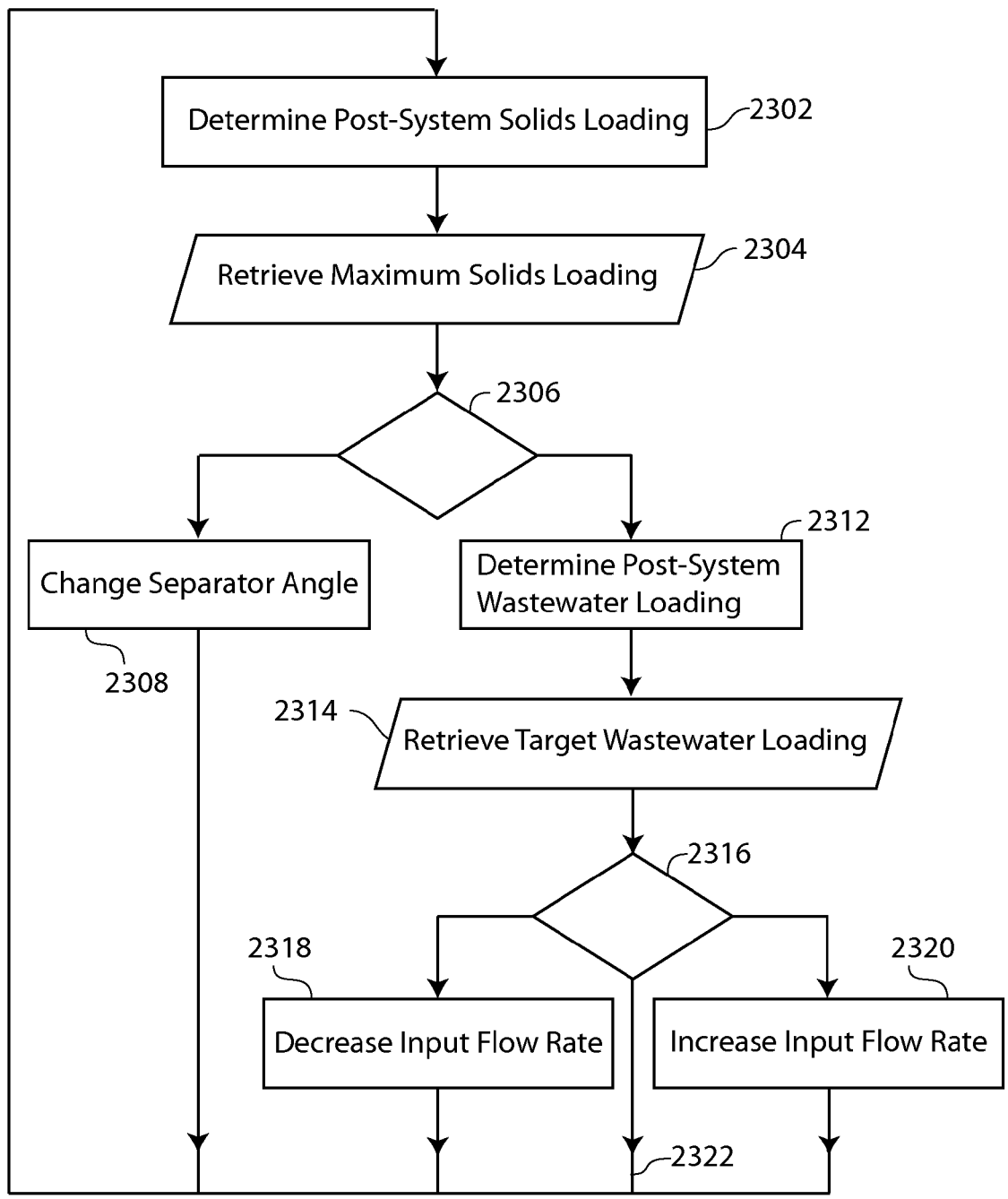
FIG. 23 shows a flow chart incorporating the centrifugal separator of FIG. 21 for control of solids loading.

FIG. 23 is a flow chart incorporating the solids density output control afforded by the separator of FIGS. 21-22. Referring to both FIGS. 22 and 23, in step 2302, the flow controller 2222 determines the post-system solids loading from the solids analyzer 2226. In step 2304, the maximum solids-loading preset quantity is retrieved from the controller's memory, a database, or other storage mechanism. In step 2306, the value retrieved in step 2304 is compared with the value determined in step 2302. If the solids loading is above the maximum allowable level, then in step 2308, the flow controller 2222 adjusts the angle of the wastewater separator 2212 by controlling the motor 2230. If the solids loading is within acceptable limits, than the flow controller in step 2312 determines the post-system wastewater loading (hydraulic loading) from the flow rate received from the flow transmitter 2224. The flow controller 2222 retrieves the target maximum wastewater loading or the wastewater loading range. In step 2316, if the wastewater loading is too high, the flow controller increases the flow rate of the diverted wastewater. If the wastewater loading is too low, than the flow controller decreases the flow rate of the diverted wastewater. If the wastewater loading is within acceptable limits, than the flow controller does not change the flow rate 2322. In all of the above describe outcomes, the process goes back to step 2302 and starts again.

While the separators described thus far in this disclosure separate solids with a specific gravity greater than one from liquid, many of the impurities are lighter water, i.e. have a specific gravity less than one. It may be desirable to also remove those lighter than water impurities from the diverted wastewater and reintroduce them back into the main flow path. In embodiments such as FIG. 1, the main flow path refers to the sewer main. In embodiments, such as FIG. 14, the main flow path refers to the main flow with the wastewater treatment plant 123 between the plant inlet and first biological treatment stage.

Figure 24:
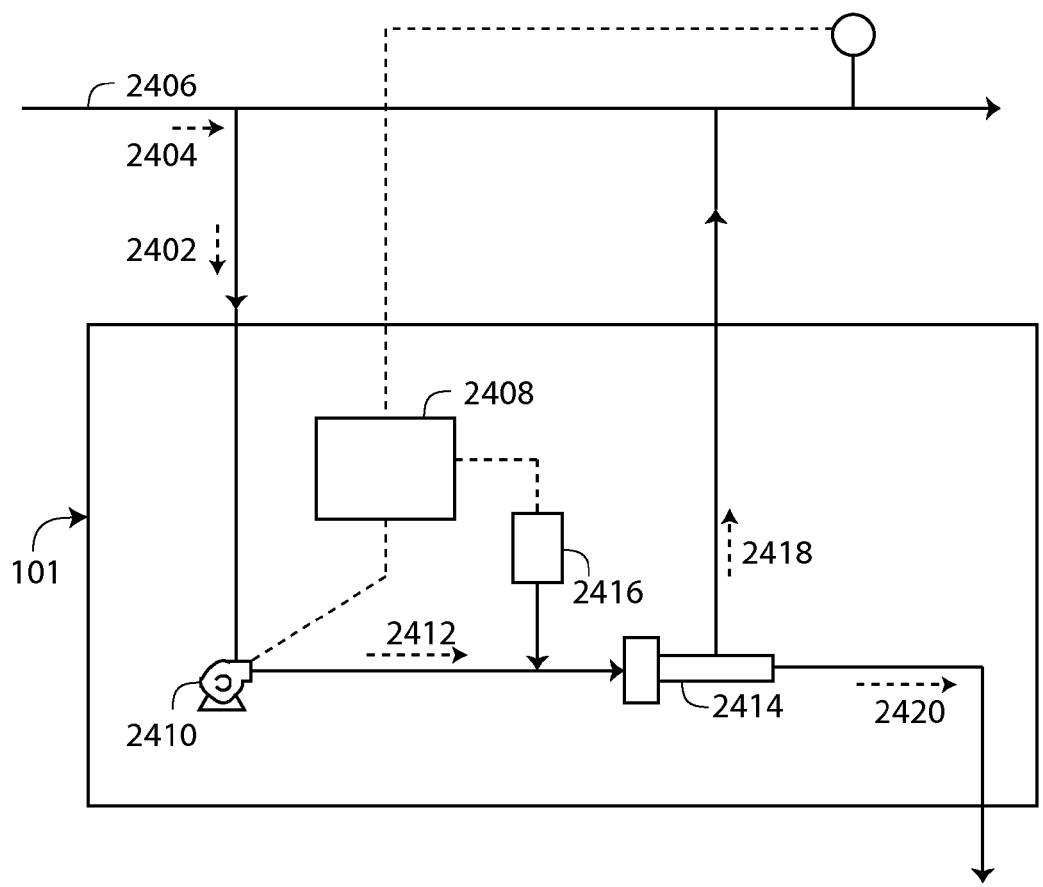
FIG. 24 shows a block diagram showing the injection of polymers in the diverted wastewater before the liquid-solid separation stage.

FIG. 24 is a block diagram of one embodiment where both lighter than water substances and heavier than water substances are separated from the liquid and reintroduced into the main flow path in a wastewater concentrator system 101. Referring to FIG. 24, a portion of wastewater 2402 is diverted from wastewater 2404 flowing through the main flow path 2406. A flow controller 2408 controls the rate of diversion by controlling the speed of a feed pump 2410. The diverted wastewater 2412 exiting the feed pump 2410 is feed to the inlet of the separator 2414. The diverted wastewater is mixed with polymers 2416. The flow controller 2408 can control the rate of mixing of polymers and wastewater. The polymers bind oils and other lighter than water substances to the solids within the water. The separator 2414 separates the solids 2418 from the liquid 2420. The solids 2418 contain a mixture of heavier than water solids and bound lighter than water liquids and particulates. The liquid 2420 can be further purified as previously described by a media filter or membrane filtration unit. The solids 2418 are reintroduced into the main flow path 2406. The flow controller 2408 can dynamically control the hydraulic loading in the main flow path 2406 below a preset level or within a preset range by controlling the speed of the feed pump 2410.

Figure 25:
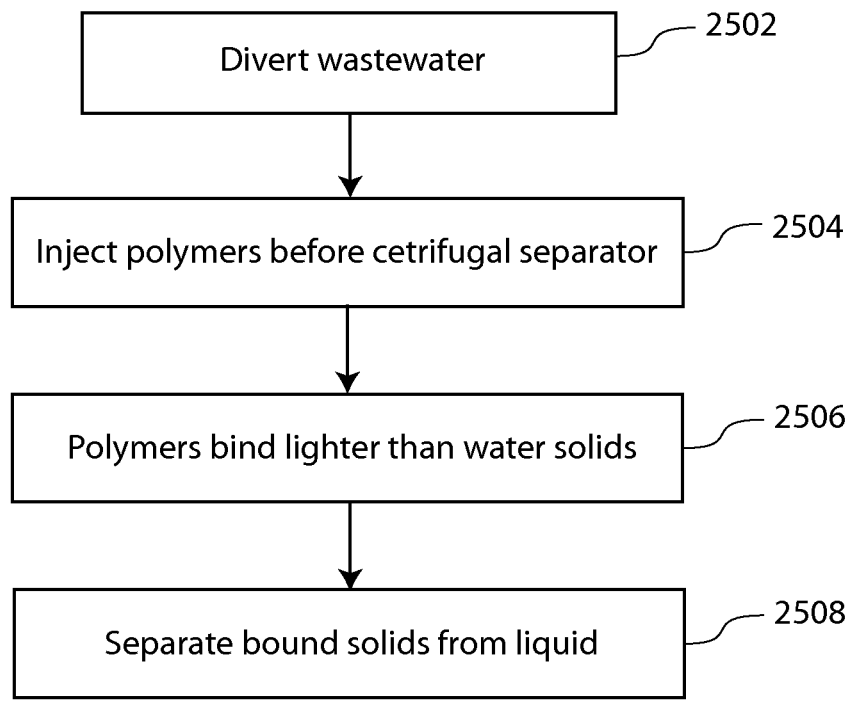
FIG. 25 shows a flow chart in accordance with FIG. 24.

FIG. 25 depicts a flow chart of the process of deriving both lighter than water liquids and particulates together from liquids in the context of a wastewater concentrator. In step 2502, wastewater is diverted from the main flow path. In step 2504 polymers area injected and mixed into the diverted wastewater stream. A flow controller controls the rate of diversion and mixing, as previously described. In step 2506, the lighter than water oils and some of the lighter than water particulates react with the polymers and bind to the solids within the diverted wastewater. In step 2508, the bound lighter than water oils and particulates and solids are separated from the liquid in a centrifugal separator.

Figure 26:
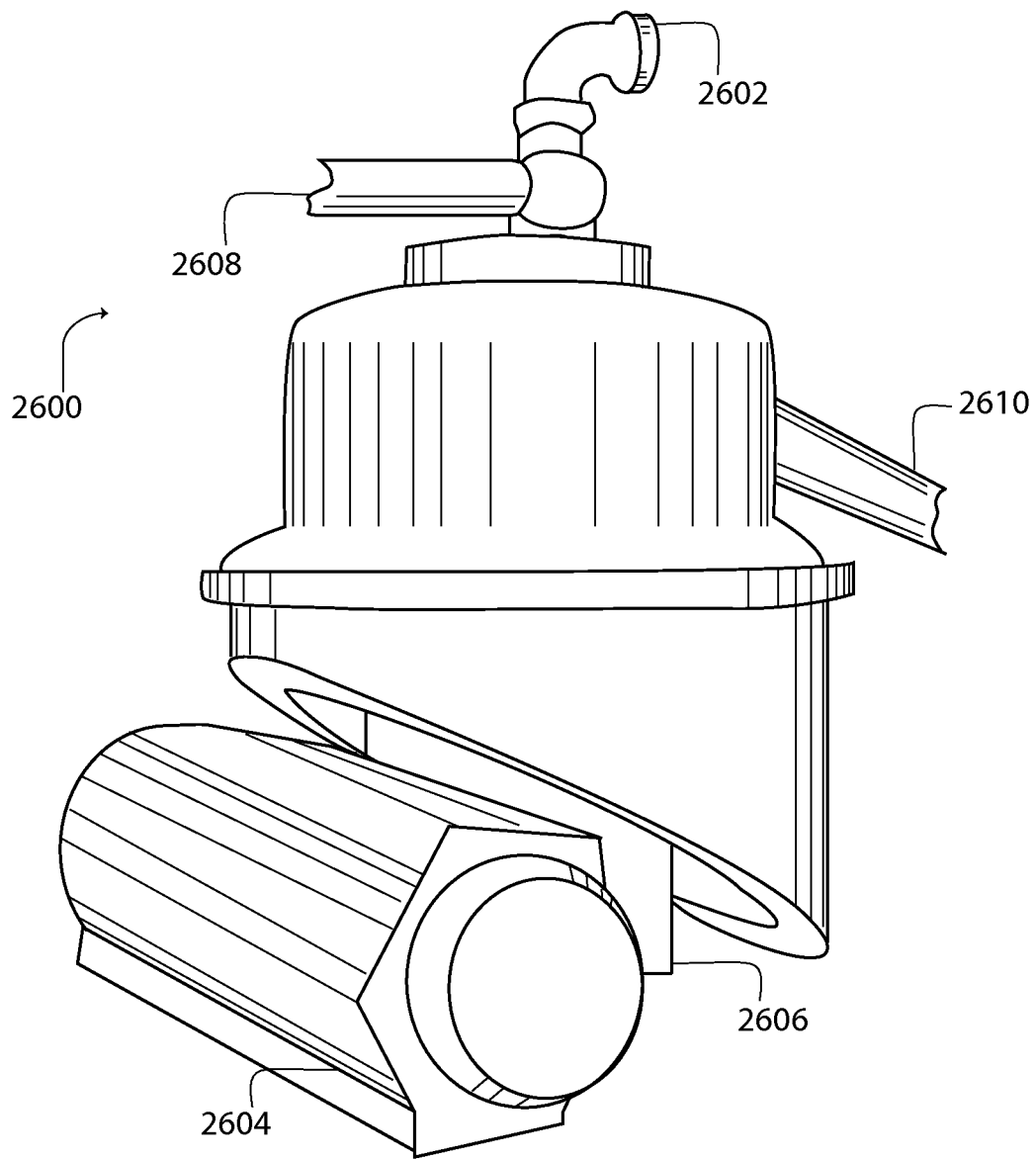
FIG. 26 shows a centrifugal separator capable of separating the diverted wastewater into three streams.

FIG. 26 depicts a typical multi-output separator. For example, an Alfa Laval separator designed to separate solids, and two densities of liquids. In an embodiment, the diverted wastewater enters the separator 2600 through the inlet pipe 2602 at the top of the separator 2600. The inlet pipe 2602 terminates into a distribution chamber in the center of the unit within a rotating centrifugal bowl. A motor 2604 rotates the bowl. The distribution chamber distributes diverted wastewater by centrifugal force a series of discs. Liquid-liquid and liquid-solid separation take place in the discs where the heavier solids move to the periphery of the separator and are discharged through the bottom of the unit through a solids discharge cover 2606 below the bottom of the centrifugal bowl. Lighter than water liquid and suspended particles (i.e. with specific gravities less than one) rise toward the top of the unit and are discharged through an outlet pipe 2608. The water rises to the top outside of the chamber where it is pumped out by a paring disc and exits through a water discharge outlet 2610.

FIG. 26 depicts one example of a centrifugal separator that separates both heavier than water solids and lighter than water oils and particulates that may be adapted as a separator in accordance with principles of the invention. Separators operating under similar principles, such as cream separators, may be adapted toward separating solids from liquid and lighter than water liquid and particulates.

Figure 27:
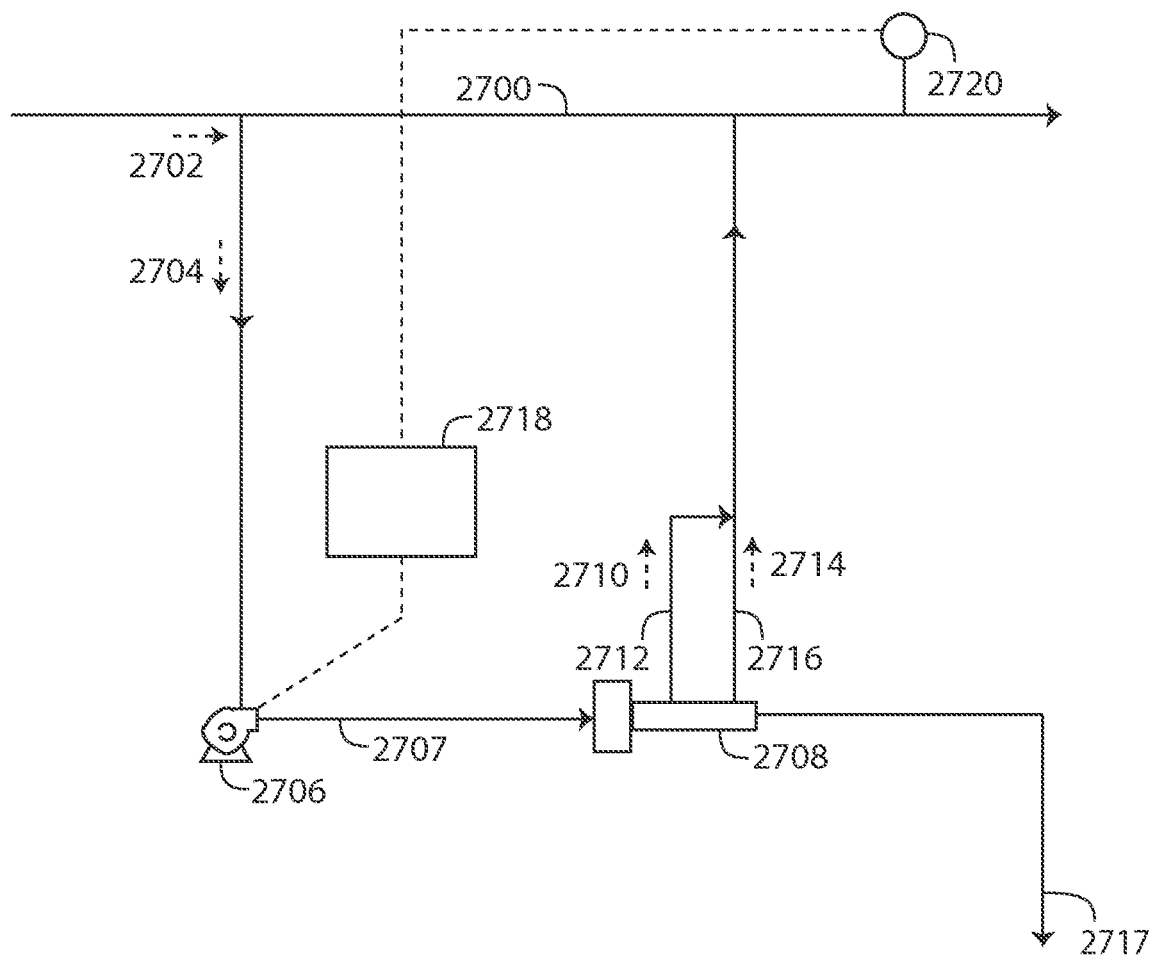
FIG. 27 shows a block diagram incorporating the centrifugal separator in accordance with principles of the invention.

FIG. 27 shows a simplified block diagram of how a separator, such as the separator 2600 of FIG. 26, can be adapted for use in a wastewater concentrator. Referring to FIG. 27, a portion of wastewater 2702 is diverted from the main flow 2700 as diverted wastewater 2704. For an application, such as depicted in FIG. 1, the main flow 2700 is a sewer main. For an application, such as depicted in FIG. 14, the main flow 2700 is the flow path between the wastewater treatment plant inlet and the first biological treatment stage. A variable speed pump 2706 forces the diverted wastewater 2704 into the feed path 2707 of the centrifugal separator 2708. The centrifugal separator 2708 discharges solids 2710 through discharge path 2712, the lighter than water liquids/particulates 2714 are discharged through discharge path 2716. The solids and lighter than water liquid/particulates are combined and reintroduced in the main flow 2700 downstream from the point of diversion. The liquid is discharged through liquid discharge port 2717. Flow controller 2718 can dynamically adjust the rate of diversion of wastewater by adjusting the speed of the variable speed pump 2706. The flow controller 2718 can control the density of solids in the discharge path 2712 by controlling the speed of the motor of the centrifugal separator 2708. The flow controller can use information obtained by a flow transmitter 2720 to dynamically adjust the hydraulic loading of the main flow 2700 to either below a maximum preset level or to within a preset range.

Accordingly, a wastewater concentrator method and system meeting the herein described objectives have been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A method for processing wastewater within a wastewater treatment plant comprising:
   diverting a portion of wastewater flowing through the wastewater treatment plant between a treatment plant inlet and a biological treatment stage;
   separating solids in the diverted wastewater from liquid therein;

reintroducing the solids before the biological treatment stage while not reintroducing at least a substantial portion of the liquid; sensing the wastewater loading in said treatment plant inlet; and
dynamically jointly adjusting in response to said sensing:
a) a rate at which the solids are reintroduced; and
b) a rate at which wastewater is diverted, the dynamically jointly adjusting being carried out in such a way that a quantity of wastewater flowing into the biological treatment stage per unit time downstream of the diverting is adjusted to be no more than a preset quantity.

2. The method of claim 1 wherein the rate at which the solids are reintroduced is dynamically adjusted such as to keep a quantity of solids per unit volume flowing into the biological treatment stage to be no more than a preset quantity.

3. The method of claim 1 wherein the separating of the solids and the liquid from the diverted wastewater is carried out by a centrifugal separator.

4. The method of claim 1 wherein the separating of the solids and the liquid from the diverted wastewater is carried out by a vortex separator.

5. The method of claim 4 wherein the vortex separator including an impeller mechanism with a hollow core and a decreasing axial pitch.

6. The method of claim 1 wherein the separating the solids and the liquid from the diverted wastewater is carried out by a cyclone separator.

7. The method of claim 1 further comprising filtering the liquid by media filtration.

8. The method of claim 1 further comprising filtering the liquid by membrane filtration.

9. The method of claim 1 further comprising:
separating material with a specific gravity of less than one; and
reintroducing material with the specific gravity of less than one before the biological treatment stage.

10. A system for adjusting wastewater loading in a feed path of a biological treatment stage in a sanitary wastewater treatment plant, comprising:
a separator configured to separate solids and liquid from the diverted wastewater, the separator including: (a) an inlet arranged and adapted to receive a portion of wastewater diverted from the feed path of the biological treatment stage, and (b) a first outlet configured to discharge the solids and not discharge at least a substantial portion of the liquid, the first outlet operatively connected to the feed path downstream from the diverted wastewater; a sensor and a flow transmitter in the treatment plant inlet for sensing the flow therein; and
one or more flow controllers, configured to dynamically jointly adjust in response to signal from said sensor and said flow transmitter:
a) a rate at which the solids are reintroduced into the feed path; and
b) a rate at which the wastewater is diverted from the feed path in such a way that a quantity of wastewater flowing into the biological treatment stage per unit time downstream of the diverting is adjusted to be no more than a preset quantity.

11. The system of claim 10, wherein the separator including a second outlet configured to discharge the liquid and not discharge at least a substantial portion of the solids.

12. The system of claim 11, further comprising:
a media filter, the media filter adapted and arranged to receive the liquid from the second outlet.

13. The system of claim 11, further comprising:
a membrane filtration unit, the membrane filtration unit adapted and arranged to receive the liquid from the second outlet.

14. The system of claim 10, wherein the separator is a centrifugal separator.

15. The system of claim 14, wherein the centrifugal separator is a vortex separator including an impeller mechanism with a hollow core and a decreasing axial pitch.

16. The system of claim 14 wherein the centrifugal separator is a cyclone separator.

17. A method for processing wastewater within a sewer main, comprising:
diverting a portion of wastewater flowing through the sewer main;
separating solids in the diverted wastewater from liquid therein;
reintroducing the solids into the sewer main and not reintroducing at least a substantial portion of the liquid; sensing the wastewater loading in said sewer main; and
dynamically jointly adjusting in response to said sensing:
a) a rate at which the solids are reintroduced; and
b) a rate at which wastewater is diverted, the dynamically jointly adjusting being carried out in such a way that a quantity of wastewater flowing through the sewer main per unit time downstream of the diverting is adjusted to be no more than a preset quantity.

18. The method of claim 17 wherein the rate at which the solids are reintroduced is dynamically adjusted such as to keep the solids per unit volume flowing down stream from the diverting to be no more than a preset quantity.

19. The method of claim 17 wherein the separating of the solids and the liquid from the diverted wastewater is carried out by a centrifugal separator.

20. The method of claim 17 wherein the separating of the solids and the liquid from the diverted wastewater is carried out by a vortex separator.

21. The method of claim 20 wherein the vortex separator including an impeller mechanism with a hollow core and a decreasing axial pitch.

22. The method of claim 17 wherein the separating the solids and the liquid from the diverted wastewater is carried out by a cyclone separator.

23. The method of claim 17 further comprising filtering the liquid by media filtration.

24. The method of claim 17 further comprising filtering the liquid by membrane filtration.

25. The method of claim 17 further comprising:
separating a substantial portion of material with a specific gravity of less than one; and
reintroducing material with the specific gravity of less than one downstream from the diverting.

26. The method of claim 17, further comprising adding polymers to the diverted wastewater before the separating.

27. A system for adjusting wastewater loading in a sewer main, comprising:
a separator configured to separate solids and liquid from the diverted wastewater, the separator including: (a) an inlet arranged and adapted to receive a portion of wastewater diverted from the sewer main, and (b) a first outlet configured to discharge the solids and not discharge at least a substantial portion of the liquid, the first outlet operatively connected to the sewer main downstream from the diverted wastewater; a sensor and a flow transmitter in the sewer main for sensing the flow therein; and
one or more flow controllers, configured to dynamically jointly adjust in response to signal from said sensor and said flow transmitter:

a) a rate at which the solids are reintroduced into the sewer main; and
b) a rate at which the wastewater is diverted from the sewer main in such a way that a quantity of wastewater flowing through the sewer main per unit time downstream of the diverting is adjusted to be within a preset range.

28. The system of claim 27, wherein the separator including a second outlet configured to discharge the liquid and not discharge a substantial portion of the solids.

29. The system of claim 28, further comprising:
a media filter, the media filter adapted and arranged to receive the liquid from the second outlet.

30. The system of claim 28, further comprising:
a membrane filtration unit, the membrane filtration unit adapted and arranged to receive the liquid from the second outlet.

31. The system of claim 27, wherein the separator is a centrifugal separator.

32. The system of claim 31, wherein the centrifugal separator is a vortex separator including an impeller mechanism with a hollow core and a decreasing axial pitch.

33. The system of claim 31 wherein the centrifugal separator is a cyclone separator.

* * * * *